US008087246B2

(12) United States Patent
Ota

(10) Patent No.: US 8,087,246 B2
(45) Date of Patent: Jan. 3, 2012

(54) SOLAR THERMAL ELECTRIC POWER GENERATION SYSTEM, HEATING MEDIUM SUPPLY SYSTEM, AND TEMPERATURE FLUCTUATION SUPPRESSING DEVICE

(75) Inventor: Hideaki Ota, Ibaraki (JP)

(73) Assignee: Kawasaki Jukogyo Kabushiki Kaisha, Kobe-shi (JP)

( * ) Notice: Subject to any disclaimer, the term of this patent is extended or adjusted under 35 U.S.C. 154(b) by 405 days.

(21) Appl. No.: 12/304,744

(22) PCT Filed: Jun. 16, 2006

(86) PCT No.: PCT/JP2006/312162
§ 371 (c)(1),
(2), (4) Date: Dec. 12, 2008

(87) PCT Pub. No.: WO2007/072591
PCT Pub. Date: Jun. 28, 2007

(65) Prior Publication Data
US 2009/0165780 A1    Jul. 2, 2009
US 2010/0132694 A2    Jun. 3, 2010

(51) Int. Cl.
*B60K 16/00* (2006.01)
*F03G 6/00* (2006.01)
*F01K 3/00* (2006.01)
*F01K 1/00* (2006.01)
*F28F 9/02* (2006.01)

(52) U.S. Cl. ........ 60/641.8; 60/641.15; 60/652; 60/659; 165/173

(58) Field of Classification Search ................ 60/641.8, 60/641.15, 659; 126/572–703; 165/10, 173–176
See application file for complete search history.

(56) References Cited

U.S. PATENT DOCUMENTS

| | | | | |
|---|---|---|---|---|
| 2,499,901 A | * | 3/1950 | Brown, Jr. ...................... | 165/160 |
| 2,602,647 A | * | 7/1952 | Miller ......................... | 165/109.1 |
| 3,350,877 A | * | 11/1967 | Bowman ........................ | 60/310 |

(Continued)

FOREIGN PATENT DOCUMENTS
EP    0526816    2/1993
(Continued)

OTHER PUBLICATIONS

ISA Japan; International Search Report of PCT/JP2006/312162; Jul. 11, 2006; WIPO.

*Primary Examiner* — Thomas Denion
*Assistant Examiner* — Christopher Jetton
(74) *Attorney, Agent, or Firm* — Alleman Hall McCoy Russell & Tuttle LLP

(57) ABSTRACT

A temperature fluctuation suppressing device for a heating medium is provided which is capable of sufficiently suppressing temperature fluctuations of the heating medium at the time of supplying collected solar heat for steam generation. The temperature fluctuation suppressing device includes a heating medium mixer provided on a heating medium supply passage configured to supply a liquid heating medium to a heat exchanging device, the heating medium mixer including: a heating medium passage forming member having plural heating medium passages; an inlet member and an outlet member provided separately from the inlet member, whereby the heating medium continuously flowing into the heating medium passage forming member through the inlet member passes through the plural heating medium passages with time-lags to form respective streams, which are then joined together before flowing out through the outlet member.

29 Claims, 24 Drawing Sheets

U.S. PATENT DOCUMENTS

| | | | |
|---|---|---|---|
| 4,192,144 A * | 3/1980 | Pierce | 60/641.8 |
| 4,807,696 A * | 2/1989 | Colvin et al. | 165/10 |
| 4,923,004 A * | 5/1990 | Fletcher et al. | 165/175 |
| 5,806,317 A * | 9/1998 | Kohler et al. | 60/659 |
| 5,867,989 A * | 2/1999 | Platell | 60/659 |
| 2006/0196631 A1* | 9/2006 | Small et al. | 165/10 |

FOREIGN PATENT DOCUMENTS

| | | |
|---|---|---|
| EP | 0750730 | 1/1997 |
| JP | 01-098836 | 4/1989 |
| JP | 8221138 A | 8/1996 |
| JP | 2004-144445 | 5/2004 |
| WO | 95/25247 | 9/1995 |

* cited by examiner (b)

(a)

(b)

(a)

SOLAR THERMAL ELECTRIC POWER GENERATION SYSTEM, HEATING MEDIUM SUPPLY SYSTEM, AND TEMPERATURE FLUCTUATION SUPPRESSING DEVICE

TECHNICAL FIELD

The present invention relates to a solar thermal electric power generation system, a heating medium supply system, and a temperature fluctuation suppressing device. More specifically, the present invention relates to: a solar thermal electric power generation system configured to generate steam by means of a heating medium heated by solar heat and drive a steam turbine by means of steam thus generated to generate electricity; a heating medium supply system configured to supply the heating medium heated by solar radiation; and a temperature fluctuation suppressing device for suppressing temperature fluctuation of the heating medium.

BACKGROUND ART

A conventional solar thermal electric power generation system 101 shown in FIG. 25 has a configuration wherein: sunlight is collected by means of a concentrating type heat collecting unit (hereinafter will be referred to as "heat collecting unit" simply) 102; a heating medium absorbs collected sunlight as thermal energy; and the heating medium is supplied to a heat exchanging device 103 to generate steam by utilizing heat of the heating medium. Saturated steam generated by the heat exchanging device 103 is then superheated by means of a superheater 104. A steam turbine 105 is driven by such superheated steam to generate electricity. In the figure, reference characters 106 and 107 denote an electricity generator and a condenser, respectively.

Methods of concentrating incidental solar radiation are roughly classified into the central receiver type, the dish type and the parabolic trough type. The heat collecting unit 102 of the parabolic trough type uses trough-shaped reflectors 102a having a parabolic section in an X-Y plane and configured to reflect sunlight thereon to concentrate the sunlight on its focal point. Heat absorbing tubes 108 with high absorptivity of solar heat each extending through the focal points of reflectors 4a along the Z-axis allow a heating medium to flow therethrough to collect solar radiation. The heat absorbing tubes 108 and heating medium supply piping 109 connected thereto make circulating flow of the heating medium between a heat exchanging device 7 and the heat collecting unit. A special synthetic oil is generally used as the heating medium. The heating medium absorbs, for example, solar heat to reach a high-temperature condition of about 400° C., releases the heat and generates steam in the heat exchanging device 103 to assume a low-temperature condition of about 300° C., and returns to the heat collecting unit 102.

As can be seen from FIG. 26 plotting the solar energy density varying during one day, the conventional solar thermal electric power generation system can operate only during daytime from sunrise to sunset. For this reason, the system is stopped at night and must be restarted in the next morning. FIG. 26 plots the solar energy density varying during one day at a region in North Africa. Curves plotting mean energy densities in July and December are shown respectively in FIG. 26, and curves plotting mean energy densities in other months are considered to fall within the range between the two curves.

As shown, the intensity of solar thermal energy reaching the heat collecting unit 102 varies from zero to maximum during one day. Therefore, the electric power generation system 101 is usually designed to have such a capacity as to generate electricity at a mean solar energy intensity level. As is often the case, the system 101 is designed to store surplus energy in excess of a mean solar energy intensity level as thermal energy in a large-scale and expensive heat storage system 110 and release the heat thus stored to generate steam thereafter, thereby making it possible to continue electric power generation. Actually, however, limitations on the system investment cost and running cost limit the heat storage capacity to about 4 to 6 hours in terms of electric power generating duration and, therefore, electric power generation cannot be continued all day long.

In an attempt to solve this problem, an integrated solar combined cycle electric power generation system has been proposed which combines the above-described steam turbine electric power generation relying upon only solar heat with the gas turbine combined cycle electric power generation (see patent documents 1 and 2 listed below for example). Such a new concept of solar thermal electric power generation system is intended to generate electricity, even during night-time or cloudy days during which solar heat cannot be utilized, by a combination of the gas turbine electric power generation system with the steam turbine electric power generation system by utilizing steam generated in a waste heat recovery boiler. The system thus configured can be expected to continue electric power generation through day and night. Also, the integrated system can be expected to reduce the fuel consumption of the gas turbine, and hence, reduce the carbon-dioxide emission amount, by utilizing solar heat during daytime to a maximum extent.

However, another type of integrated solar combined cycle electric power generation system includes a heat collecting unit configured to generate saturated steam directly from water and supply it to the steam turbine without using a special heating medium and a heat exchanging device. This kind of electric power generation system according to patent document 1 is configured to mix the saturated steam with the steam generated from a high-pressure turbine for superheating the saturated steam before supplying the steam to the steam turbine. On the other hand, another kind of the electric power generation system according to patent document 2 is configured to mix the saturated steam with the steam generated from a high-pressure turbine and then superheat the saturated steam by means of a reheater of the waste heat recovery boiler before supplying the steam to the steam turbine.

Regardless of whether the conventional solar thermal electric power generation system or the integrated solar combined cycle electric power generation system is used, there exists an unavoidable problem. This problem is associated with the condition of solar radiation onto the surface of the Earth incidentally changing (with time) during daytime. In the solar heat collecting unit, heat transfer from solar heat to steam or other heating medium is mostly based on solar radiation condition. Accordingly, the temperature of steam or other heating medium absorbing solar heat fluctuates in exact response with changes in the condition of sunshine onto the surface of the Earth. As a result, the condition of generated steam (including temperature, pressure, dryness and the like) to be supplied to the steam turbine always fluctuates, which causes the generated electricity to fluctuate. If vigorous fluctuation occurs in the condition of steam, the waste heat recovery boiler or the steam turbine might be damaged thereby.

With the two systems disclosed in patent documents 1 and 2 for example, the condition of steam (including temperature, pressure, dryness and the like) generated in a heat absorbing tube associated with the heat collecting unit fluctuates, thus causing steam to lose heat while being fed from the heat collecting unit to the steam turbine. As a result, the system according to patent document 1 allows the condition of steam to fluctuate after mixing with the steam generated from the high-pressure turbine. The system according to patent document 2 allows the condition of steam to fluctuate at the inlet side of the reheater thereby influencing the waste heat recovery boiler. That is, when the sunshine condition suddenly fluctuates largely or frequently, the condition of steam generated in the heat collecting unit fluctuates likewise, which makes it difficult for the whole of the integrated solar combined cycle electric power generation system to serve continuously for stable and safe operation.

Such fluctuations in sunshine conditions are caused by clouds, sandstorms or the like. When the aforementioned reflector is bent by wind incidentally, sunlight cannot be sufficiently concentrated on the aforementioned heat absorbing tube. This also causes temperature fluctuations of the heating medium or the like. Since such fluctuations possibly occur at short intervals, the aforementioned heat storage system cannot be utilized to suppress effectively the temperature fluctuations of the heating medium or the like.

Patent document 1: European Patent Laid-Open Publication No. 0750730

Patent document 2: European Patent Laid-Open Publication No. 0526816

DISCLOSURE OF INVENTION

Problem to be Solved by Invention

The present invention has been made in order to solve such problems. Accordingly, it is an object of the present invention to provide a temperature fluctuation suppressing device which is capable of sufficiently suppressing temperature fluctuation of a heating medium that supplies, for example, a solar thermal electric power generation system, to supply heat for steam generation, thereby lessening or eliminating the temperature fluctuations even if the temperature of the heating medium fluctuates incidentally with time. It is another object of the present invention to provide a heating medium supply system which is capable of supplying the heating medium to a heat exchanging device while suppressing temperature fluctuations thereof. It is a further object of the present invention to provide a solar thermal electric power generation system which is capable of supplying to a steam turbine the steam generated by solar heat having been transferred through the heating medium while keeping the steam in a stably superheated condition.

Means for Solving Problem

In order to attain the aforementioned objects, the present invention provides a temperature fluctuation suppressing device for a heating medium provided on a heating medium supply passage for supplying a liquid heating medium to a heat exchanging device, which comprises a heating medium mixer for mixing the heating medium, the heating medium mixer comprising:

a heating medium passage forming member having plural heating medium passages;

an inlet member allowing the heating medium to flow into the heating medium passage forming member from the heating medium supply passage; and an outlet member allowing the heating medium to flow out of the heating medium passage forming member to the heating medium supply passage, the outlet member being provided separately from the inlet member, whereby the heating medium continuously flowing into the heating medium passage forming member through the inlet member passes through the plural heating medium passages with time-lags to form respective streams, which are then joined together before flowing out through the outlet member.

The liquid heating medium continuously supplied through the heating medium supply passage flows into the heating medium passage forming member and passes through the plural heating medium passages to form respective streams. The streams outgoing from the respective passages are time-lag mixed when joined together. Even when the temperature of the heating medium fluctuates, the time-lag mixing makes it possible to reduce the range of temperature fluctuation as well as to lower the temperature fluctuation speed. As a result, the condition of steam generated by heat transferred by the heating medium is made uniform throughout the operation time. "Time-lag mixing," as used above, means mixing of the temperature fluctuating heating medium continuously flowing into the heating medium passage forming member with time-lags with the temperature fluctuating heating medium residing in the temperature fluctuation suppressing device having already been fed into the heating medium passage forming member.

The location at which the heating medium supply passage is connected to the inlet member is not limited to the upstream side of the heating medium supply passage. Likewise, the location at which the heating medium supply passage is connected to the outlet member is not limited to the downstream side of the heating medium supply passage. For example, an arrangement as shown in FIG. 18 may be employed wherein: the heating medium supply passage is provided with a return passage comprising downstream side inlet piping and outlet piping; the heating medium passage forming member is provided on the return passage with its inlet member connected to the downstream side of the heating medium supply passage and its outlet member connected to the upstream side of the heating medium supply passage; and the return passage is provided with means for feeding the heating medium with a pressure to the heating medium passage forming member.

It is possible that the heating medium passage forming member comprises a first container defining therein plural cells each forming a respective one of said heating medium passages;

each of the cells has an inlet and an outlet for the heating medium;

the inlet member comprises branch portions branched off from the heating medium supply passage which are each connected to a respective one of the inlets of the cells;

the outlet member unifies the outlets of the cells and is connected to the heating medium supply passage; and the branch portions of the inlet member are each provided with a flow control device which is capable of adjusting a flow rate of the heating medium.

By supplying to the cells with the heating medium at different flow rates, the heating medium passes through the plural cells with time-lags to form respective streams. When the streams of the heating medium are joined together thereafter, time-lag mixing of the streams of the heating medium is allowed to occur, thereby suppressing temperature fluctuation of the heating medium.

An alternative arrangement is possible wherein:

the heating medium passage forming member comprises a first container defining therein plural cells forming a respective one of the heating medium passages;

each of the cells has an inlet and an outlet for the heating medium;

the inlet member comprises branch portions branched off from the heating medium supply passage which are each connected to a respective one of the inlets of the cells;

the outlet member unifies the outlets of the cells and is connected to the heating medium supply passage; and the plural cells are formed to have different kinds of volume.

With the cells having different kinds of volume, the heating medium passes through the plural cells with time-lags to form respective streams. When the streams of the heating medium are joined together thereafter, time-lag mixing of the streams of the heating medium is allowed to occur, thereby suppressing temperature fluctuation of the heating medium.

It is possible that: the heating medium passage forming member comprises plural second containers each forming a respective one of the heating medium passages;

each of the second containers has an inlet and an outlet for the heating medium;

the inlet member comprises branch portions branched off from the heating medium supply passage which are each connected to a respective one of the inlets of the cells;

the outlet member unifies the outlets of the second containers and is connected to the heating medium supply passage; and the branch portions of the inlet member are each provided with a flow control device which is capable of adjusting flow rate of the heating medium.

An alternative arrangement is possible wherein:

the heating medium passage forming member comprises plural second containers each forming a respective one of the heating medium passages;

each of the second containers has an inlet and an outlet for the heating medium;

the inlet member comprises branch portions branched off from the heating medium supply passage which are each connected to a respective one of the inlets of the cells;

the outlet member unifies the outlets of the second containers and is connected to the heating medium supply passage; and the plural second containers are formed to have different kinds of volume.

The plural second containers described above may be bound together or separated from each other individually.

It is possible that: the heating medium passage forming member comprises a third container provided therein with a perforated plate having multiple perforations each forming a respective one of the heating medium passages;

the third container is provided with the inlet member and the outlet member; and the perforated plate is positioned to partition an internal space of the third container into a space on an inlet member side and a space on an outlet member side.

The heating medium supplied into the third container through the inlet member passes through the multiple perforations spaced with different distances from the inlet member and then flows into the space on the outlet member side. Accordingly, the heating medium flowing into the third container forms different streams reaching the space on the outlet member side with time-lags. The streams thus formed are joined together in the space on the outlet member side, thus resulting in time-lag mixing of the heating medium.

The perforated plate may comprise a plurality of such perforated plates spaced from each other.

Preferably, the perforations are formed over the perforated plate except a region of the perforated plate including a portion of the perforated plate intersecting a central axis of a heating medium flow passage defined by the inlet member to extend inwardly of the third container and a region around that portion. This feature allows the heating medium having flown into the third container to reside therein for a prolonged time.

In the temperature fluctuation suppressing device having the first container or the second containers, the outlet for the heating medium is preferably formed at a location offset from an extension of a central axis of the inlet. This feature allows the heating medium having flown into the first container or each of the second containers to reside therein for a prolonged time.

In the temperature fluctuation suppressing device having the first container or the second containers, the inlet for the heating medium is preferably provided with a heating medium introducing device configured to adjust an inflow angle of the heating medium flowing into an associated one of the passages formed by the heating medium passage forming member. This is because the inflow angle of the heating medium can be adjusted so as to allow effective time-lag mixing of the heating medium to occur within the first container or each of the second containers.

In the temperature fluctuation suppressing device having the third container, preferably, a heating medium introducing device configured to adjust an inflow angle of the heating medium flowing into the third container is provided on one of the inlet members and a portion of the third container lying adjacent to the inlet member. This is because the inflow angle of the heating medium can be adjusted so as to allow effective time-lag mixing of the heating medium to occur within the first container or each of the second containers.

In the temperature fluctuation suppressing device having the heating medium introducing device, the heating medium introducing device may have a adjustable louvers comprising at least one louver pivotally mounted to allow an angle of inclination thereof to be adjustable from outside.

In the temperature fluctuation suppressing device having the third container, the inlet member may comprise a plurality of such inlet members to allow one of the inlet members to be switchingly selected for the heating medium to flow into the third container therethrough. This arrangement is capable of selecting one of the inlet members for effective time-lag mixing of the heating medium.

In the temperature fluctuation suppressing device having such an arrangement, the outlet member may comprise a plurality of such outlet members to allow one of the outlet members to be switchingly selected in synchronism with switching between the inlet members for the heating medium to flow out of the third container therethrough.

In the temperature fluctuation suppressing device having the third container, the inlet member may comprise a plurality of such inlet members each provided with a flow control device for adjusting flow rate of the heating medium passing through an associated one of the inlet members. If one of the inlet members through which the heating medium is to flow into the third container is switched to another one periodically for example, the time-lag mixing effect of the heating medium within the third container can be increased.

The heating medium mixer may be additionally provided therein with a stirring device for stirring the heating medium. Such stirring devices which can be employed include various rotors such as a screw propeller, a forced jet device and others.

It is possible that: an inlet temperature measuring device is provided on one of the inlet members and a heating medium supply passage connected to the inlet member for measuring an inlet temperature of the heating medium; and an outlet temperature measuring device is provided on one of the outlet members and a heating medium supply passage connected to the outlet member for measuring an outlet temperature of the heating medium.

The temperature fluctuation suppressing device may further comprise a control device configured to perform a comparison between temperature fluctuation of the heating medium flowing into the heating medium passage forming member and temperature fluctuation of the heating medium flowing out of the heating medium passage forming member based on values measured by the inlet temperature measuring device and the outlet temperature measuring device, respectively, and perform control so as to adjust flow rate of the heating medium flowing into the heating medium passage forming member based on a result of the comparison.

The temperature fluctuation suppressing device may further comprise a control device configured to perform a comparison between temperature fluctuation of the heating medium flowing into the heating medium passage forming member and temperature fluctuation of the heating medium flowing out of the heating medium passage forming member based on values measured by the inlet temperature measuring device and the outlet temperature measuring device, respectively, and perform control so as to adjust inflow direction of the heating medium flowing into the heating medium passage forming member based on a result of the comparison.

A heating medium supply system according to the present invention comprises:

a heating system configured to heat a liquid heating medium by sunlight;

a heat exchanging device configured to heat water supplied thereto by means of the heating medium supplied thereto from the heating system;

a heating medium supply passage for supplying the heating medium from the heating system to the heat exchanging device; and a temperature fluctuation suppressing device provided on the heating medium supply passage for suppressing temperature fluctuation of the heating medium, the temperature fluctuation suppressing device being any one of the temperature fluctuation suppressing devices described above.

Such a heating medium supply system may further comprise:

an outlet passage connecting an outlet member of a heating medium mixer provided in the temperature fluctuation suppressing device to the heating medium supply passage;

an upstream side inlet passage connecting an inlet member of the heating medium mixer to a portion of the heating medium supply passage located upstream of a joint between the outlet passage and the heating medium supply passage; and a heating medium feeding device provided on the upstream side inlet passage for feeding the heating medium with a pressure toward the heating medium mixer.

Alternatively, the heating medium supply system may further comprise:

an outlet passage connecting an outlet member of a heating medium mixer to the heating medium supply passage;

a downstream side inlet passage connecting an inlet member of the heating medium mixer to a portion of the heating medium supply passage located downstream of a joint between the outlet passage and the heating medium supply passage; and a heating medium feeding device provided on the downstream side inlet passage for feeding the heating medium with a pressure toward the heating medium mixer.

Alternatively, the heating medium supply system may further comprise:

an outlet passage connecting an outlet member of a heating medium mixer to the heating medium supply passage;

an upstream side inlet passage connecting an inlet member of the heating medium mixer to a portion of the heating medium supply passage located upstream of a joint between the outlet passage and the heating medium supply passage;

a downstream side inlet passage connecting the inlet member of the heating medium mixer to a portion of the heating medium supply passage located downstream of the joint between the outlet passage and the heating medium supply passage; and a heating medium feeding device provided on each of the upstream side inlet passage and the downstream side inlet passage for feeding the heating medium with a pressure toward the heating medium mixer.

Alternatively, the heating medium supply system may further comprise:

an outlet passage connecting an outlet member of a heating medium mixer to the heating medium supply passage;

an upstream side inlet passage connecting an inlet member of the heating medium mixer to a portion of the heating medium supply passage located upstream of a joint between the outlet passage and the heating medium supply passage;

a return passage connecting a portion of the heating medium supply passage located downstream of the joint between the outlet passage and the heating medium supply passage to a portion of the heating medium supply passage located upstream of the joint between the upstream side inlet passage and the heating medium supply passage;

a heating medium feeding device provided on the upstream side inlet passage for feeding the heating medium with a pressure toward the heating medium mixer; and a heating medium feeding device provided on the return passage for feeding the heating medium with a pressure toward an upstream side portion of the heating medium supply passage.

Alternatively, the heating medium supply system may have an arrangement wherein a heating medium mixer provided in the temperature fluctuation suppressing device has two inlet members, one of which is connected to an upstream side portion of the heating medium supply passage, and an outlet member connected to a downstream side portion of the heating medium supply passage, the heating medium supply system further comprising:

a return passage connecting the other inlet member of the heating medium mixer to the downstream side portion of the heating medium supply passage; and a heating medium feeding device provided on the return passage for feeding the heating medium with a pressure toward the heating medium mixer.

Alternatively, the heating medium supply system may have an arrangement wherein a heating medium mixer provided in the temperature fluctuation suppressing device has an outlet member connected to a downstream side portion of the heating medium supply passage, and an inlet member connected to an upstream side portion of the heating medium supply passage, the heating medium supply system further comprising:

a return passage connecting the upstream side portion of the heating medium supply passage located upstream of the heating medium mixer to the downstream side portion of the heating medium supply passage located downstream of the heating medium mixer; and a heating medium feeding device provided on the return passage for feeding the heating medium with a pressure from the downstream side to the upstream side of the heating medium supply passage.

Alternatively, the heating medium supply system may have an arrangement wherein:

the heating system has plural heat collecting zones each provided with a heat collecting unit for heating the heating medium by sunlight collected; and the plural heat collecting zones are each connected to a respective one of heating medium passages formed by a heating medium passage forming member of the temperature fluctuation suppressing device through a respective one of plural heating medium supply passages so as to supply the liquid heating medium from one heat collecting zone to one heating medium passage.

Another type of heating medium supply system according to the present invention comprises:

a heating system configured to heat a liquid heating medium by sunlight;

a heat exchanging device configured to heat water supplied thereto by means of the heating medium supplied thereto from the heating system;

a heating medium supply passage for supplying the heating medium from the heating system to the heat exchanging device; and a temperature fluctuation suppressing device provided on the heating medium supply passage for suppressing temperature fluctuation of the heating medium, the temperature fluctuation suppressing device comprising a branch passage branched off from the heating medium supply passage and again connected to the heating medium supply passage, and a heating medium feeding device provided on the branch passage for feeding the heating medium with a pressure from the downstream side to the upstream side of the heating medium supply passage.

Yet another type of heating medium supply system according to the present invention comprises:

a heating system configured to heat a liquid heating medium by sunlight;

a heat exchanging device configured to heat water supplied thereto by means of the heating medium supplied thereto from the heating system;

a heating medium supply passage for supplying the heating medium from the heating system to the heat exchanging device; and a temperature fluctuation suppressing device provided on the heating medium supply passage for suppressing temperature fluctuation of the heating medium, the temperature fluctuation suppressing device comprising a branch passage branched off from the heating medium supply passage and again connected to the heating medium supply passage, and a heating medium feeding device provided on the branch passage for feeding the heating medium with a pressure from the upstream side to the downstream side of the heating medium supply passage.

Still another type of heating medium supply system according to the present invention comprises:

a heating system configured to heat a liquid heating medium by sunlight;

a heat exchanging device configured to heat water supplied thereto by means of the heating medium supplied thereto from the heating system;

a heating medium supply passage for circulating the heating medium between the heating system and the heat exchanging device; and a temperature fluctuation suppressing device provided on the heating medium supply passage for suppressing temperature fluctuation of the heating medium, the temperature fluctuation suppressing device comprising a bypass passage interconnecting an inlet side and an outlet side of the heat exchanging device on the heating medium supply passage, and a heating medium feeding device provided on the bypass passage for feeding the heating medium with a pressure from the outlet side to the inlet side of the heat exchanging device.

A solar thermal electric power generation system according to the present invention comprises:

a steam turbine; and a heating medium supply system configured to supply a heating medium for heating water to generate steam to be supplied to the steam turbine, wherein the heating medium supply system is a heating medium configured to supply steam generated by a heat exchanging device included in the heating medium supply system to the steam turbine.

The solar thermal electric power generation system described above may further comprise:

a gas turbine; and a waste heat recovery boiler utilizing waste heat from the gas turbine, wherein steam generated by the waste heat recovery boiler is supplied to the steam turbine.

ADVANTAGE OF INVENTION

According to the present invention, a liquid heating medium which is supplied to a heat exchanging device in such a system as a solar thermal electric power generation system while fluctuating in temperature is subjected to time-lag mixing relying upon a simple arrangement, whereby the temperature fluctuation of the liquid heating medium can be suppressed or lessened. That is, the present invention makes it possible to narrow the range of temperature fluctuation as well as to eliminate short-cycle and medium-cycle temperature fluctuations to leave a long-cycle temperature fluctuation only.

DESCRIPTION OF REFERENCE CHARACTERS

Figure 1:
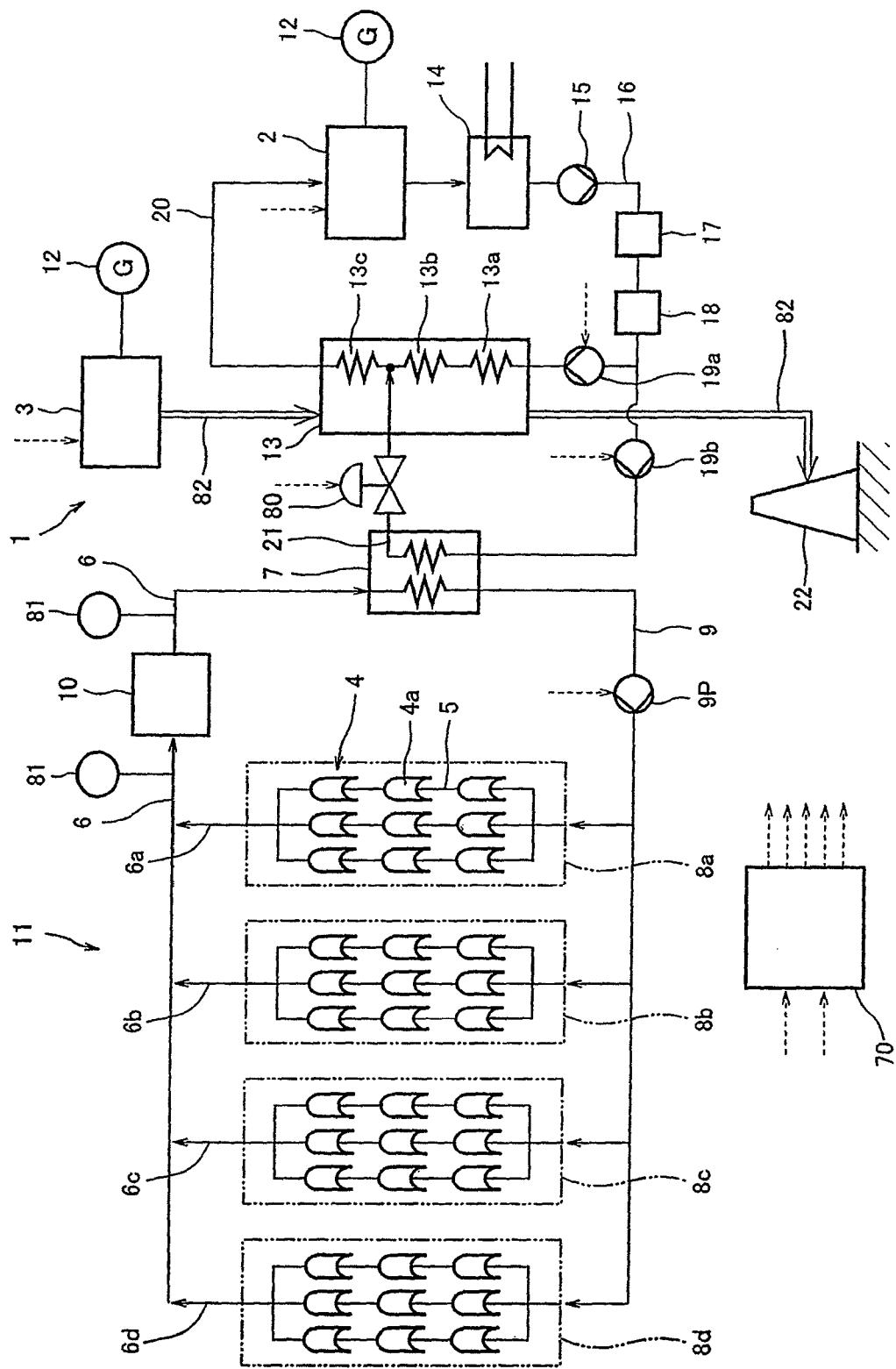
FIG. 1 is a piping diagram schematically illustrating an integrated solar combined cycle electric power generation system as one embodiment of the present invention.

1 . . . electric power generation system
2 . . . steam turbine
3 . . . gas turbine
4 . . . heat collecting unit
5 . . . solar heat absorbing tube
6 . . . heating medium supply piping
7 . . . heat exchanging device
8 . . . solar heat collecting zone
9 . . . return piping
10 . . . heating medium mixer
11 . . . heating medium supply system
12 . . . electricity generator
13 . . . waste heat recovery boiler
14 . . . condenser
15 . . . condensed water supply pump
16 . . . condensed water supply piping
17 . . . water heater
18 . . . deaerator
19 . . . pump
20 . . . first steam supply piping
21 . . . second steam supply piping
22 . . . chimney
23 . . . heating medium supply system
24 . . . heating medium mixer
25 . . . heating medium supply system
26 . . . heating medium supply system
27 . . . heat storage system
28 . . . bypass piping
29 . . . heating medium passage forming member
30 . . . cell (heating medium passage)
31 . . . tank
32 . . . cylindrical partition wall
33 . . . inlet hole
34 . . . outlet hole
35 . . . piping
36 . . . flow control valve
37 . . . heating medium mixer
38 . . . cell (heating medium passage)
39 . . . heating medium passage forming member
40 . . . heating medium mixer
41 . . . heating medium passage forming member
42 . . . lateral partition wall
43 . . . cell (heating medium passage)
44 . . . piping
45 . . . heating medium mixer
46 . . . container (cell)
47 . . . heating medium passage forming member
48 . . . heating medium mixer
49 . . . heating medium passage forming member
50 . . . heating medium mixer
51 . . . tank 52 ... perforated plate
53 ... perforation-free region
54 ... heating medium mixer
55 ... inclined piping
56 ... heating medium mixer
57 ... heating medium introducing device
58 ... housing
59 ... adjustable louver
60 ... piping
61 ... piping
62 ... flow control valve
63 ... outlet piping
64 ... upstream side inlet piping
65 ... pump
66 ... downstream side inlet piping
67 ... return piping
68 ... return piping
69 ... return piping
70 ... control device
80 ... flow control valve
81 ... temperature measuring device
82 ... exhausted gas passage
91,92 ... inlet member
93 ... outlet member

BEST MODE FOR CARRYING OUT THE INVENTION

Embodiments of integrated solar combined cycle electric power generation system, heating medium supply system and temperature fluctuation suppressing device according to the present invention will be described with reference to the attached drawings.

FIG. 1 shows an integrated solar combined cycle electric power generation system 1 in which steam turbine electric power generation by a steam turbine 2 driven by utilizing part of the steam generated while relying upon solar heat and gas turbine electric power generation by a gas turbine 2 driven by burning a fuel gas such as natural gas are combined with each other. The electric power generation system 1 uses reflectors 4a of the parabolic trough type forming a heat collecting unit 4. Each of the reflectors 4a is trough-shaped having a parabolic section in an X-Y plane and configured to reflect rays of sunlight incident thereon to collect them on its focal point.

A heat absorbing tube 5, which extends through the focal point of reflectors 4a along the Z-axis, allows a liquid heating medium to flow therein. Heating medium supply piping 6 connected to such heat absorbing tubes 5 allows for circulation of the heating medium between a heat exchanging device 7 and heat collecting units 4. The heat exchanging device 7 serves as an evaporator. The heating medium absorbs solar heat through the heat collecting units 4, supplies the collected solar heat to the water for generating steam at the heat exchanging device 7, and returns to the heat collecting units 4.

The electric power generation system 1 has plural heat collecting zones 8a, 8b, 8c and 8d in each of which a respective heat collecting unit 4 is installed. This is because even if the entire installation area of the heat collecting units (usually an area of about 1400 m×700 m for the total system capable of generating electric power of 30 MW for example) is not uniformly flattened, the solar collecting zone is divided for effective installation of the heat collecting units. Alternatively, the solar collecting zone is divided so as not to make the loop length of heating medium supply piping too long thereby to avoid an excessive pressure loss through the piping. Further, the division of the solar collecting zone makes it possible to avoid stoppage of the entire system when inspecting and repairing some portion of the heat absorbing tube 5 and the heat collecting unit 4, even when the heat absorbing tube 5 or the unit 4 are not functioning normally.

Lines of heating medium supply piping 6a, 6b, 6c and 6d extending from the respective heat collecting zones 8a, 8b, 8c and 8d are unified and then connected to the heat exchanging device 7. The heating medium supply piping 6 thus unified is provided with a heating medium mixer 10 to be described later. The heat exchanging device 7 has an outlet joined to return piping 9 connected to the heat collecting zones. The "heating medium supply piping 6," as referred to herein, includes the return piping 9. The heating medium supply piping 6 is provided with a circulating pump 9P for circulating the heating medium. Though the single pump 9P is shown in FIG. 1, a plurality of such pumps may be used for sharing a pressure loss in the piping when necessary if the heating medium supply piping 6 is too long and large. The heat collecting units 4, heating medium supply piping 6, heat exchanging device 7 and heating medium mixer 10 form a heating medium supply system 11.

On the other side, electric power generation is conducted by the steam turbine 2 and the gas turbine 3, as described above. The two turbines 2 and 3 are connected to respective electricity generators 12. The electric power generation system 1 is provided with a waste heat recovery boiler 13. High temperature combusted gas (exhaust gas) exhausted from the gas turbine 3 is supplied to the waste heat recovery boiler 13 to heat the supplied water for generating steam and then emitted into open air from a chimney 22 through exhausted gas passage 82. The steam turbine 2 is driven both by the steam generated from the heat exchanging device 7 and the steam generated from the waste heat recovery boiler 13.

The steam having driven the steam turbine 2 is condensed into water by a condenser 14 and then fed with a pressure into a water supply piping 16 by means of a water supply pump 15. Specifically, firstly, the condensed water is heated by a supplied water heater 17 and then deaerated by a deaerator 18. Subsequently, water is passed through branched lines and supplied to the waste heat recovery boiler 13 and the heat exchanging device 7 by means of respective pumps 19a and 19b. The steam generated from the heat exchanging device 7 and the steam generated from the waste heat recovery boiler 13 are joined together and supplied to the steam turbine 2 through a first steam supply piping 20. The flow rate distribution of water to be supplied to the waste heat recovery boiler 13 and to the heat exchanging device 7 is controlled in accordance with actual demand for electricity and actually collected solar thermal energy based on a steam production program determined at a planning stage of the electric power generation system.

The aforementioned waste heat recovery boiler 13 generally includes an economizer (preheater) 13a, an evaporator 13b, and a superheater 13c. The steam generated in the heat exchanging device 7 is in a saturated condition. Therefore, the saturated steam needs to be superheated before being supplied to the steam turbine 2. To this end, a second steam supply piping 21 is provided to interconnect the steam outlet of the heat exchanging device 7 and the inlet side of the superheater 13c of the waste heat recovery boiler 13 so that the saturated steam from the heat exchanging device 7 can be superheated by the superheater 13c.

The second steam supply piping 21 is preferably provided with a flow control valve 80. The flow control valve 80 is controlled so as to prevent the steam supply rate to the waste heat recovery boiler 13 from changing steeply and enormously because of a rapid decrease in collected solar heat due to shading sunlight by clouds during daytime, a steep drop in the solar heat collecting efficiency due to bending of reflectors in the heat collecting units 4 caused by wind pressure, or a rapid decrease in the solar heat after sunset. Also, the flow control valve 80 is controlled so that the amount of generated steam that begins increasing with the rising sun may be kept within an allowable range of the waste heat recovery boiler 13. Further, the flow control valve 80 is controlled to close the second steam supply piping 21 particularly after sunset because the steam in the second steam supply piping 21 naturally runs out.

The saturated steam supplied from the heat exchanging device 7 through the second steam supply piping 21 is mixed with the steam generated by the evaporator 13b of the waste heat recovery boiler 13 on the inlet side of the superheater 13c and then supplied to the superheater 13c. The superheater 13c is designed and manufactured to have the capability (heating area) of heating the total amount of the saturated steam from the heat exchanging device 7 and the saturated steam from the evaporator 13b up to a predetermined superheat temperature, so that the waste heat recovery boiler 13 can supply the steam turbine 2 with the superheated steam of stabilized properties.

In the integrated solar combined cycle electric power generation system 1, the temperature of the heating medium to be supplied from the heat collecting zone 8 fluctuates with time as weather conditions, including sunshine conditions, change. However, the heating medium supply piping 6 is provided with the aforementioned heating medium mixer 10 which is configured to suppress temperature fluctuations of the heating medium so that the heating medium reaching the heat exchanging device 7 is made sufficiently uniform (stable) in temperature. The heating medium mixer 10 is provided with a heating medium inlet member 91 connected to the upstream side of the heating medium supply piping 6 and a heating medium outlet member 93 formed separately from the inlet member 91 and connected to the downstream side of the heating medium supply piping 6. Also, the heating medium mixer 10 defines therein plural heating medium passages, as will be described later.

The heating medium mixer 10 can be made to have substantially a similar size of the heat exchanging device 7. For example, it is sufficient to provide about two heating medium mixers each having a diameter of about 2 m and a length of about 10 m for example for the heat collecting units of the system capable of generating electric power of the order of 30 MW. Of course, the number or the size of such heating medium mixers can be further increased to accommodate the diversity because of properties of the heating medium actually used or actual temperature fluctuations respectively. The heating medium flowing into the heating medium mixer 10, with its temperature fluctuating moment by moment, is time-lag mixed within the heating medium mixer 10. Specifically, portions of the heating medium that flow into the heating medium mixer 10 at a certain time are passed through the different heating medium passages to form different streams within the heating medium mixer 10, thus providing such a distribution of streams as to allow some portions to flow out through the outlet member 93 for a relatively short time and simultaneously cause other portions to reside in the passages of the heating medium mixer 10 for a relatively long time. Since fresh portions of the heating medium newly flow into the heating medium mixer 10 through the inlet member 91 continuously, the portions of the heating medium that flowed into the mixer 10 in the past and the portions that have newly flowed thereinto are mixed together incessantly. Accordingly, non-uniformity in the temperature of the heating medium that occurs with time, namely, temperature fluctuations of the heating medium, can be made uniform. This function is referred to as "time-lag mixing". By subjecting the heating medium to time-lag mixing, the temperature fluctuation range of the heating medium is narrowed and the temperature fluctuation speed lowered. The heating medium mixer 10 performing the time-lag mixing functions as a temperature fluctuation suppressing device for the heating medium. The configuration of the temperature fluctuation suppressing device including the heating medium mixer 10 will be described in detail hereafter. Portions of the heating medium supply piping 6 which are located on the upstream side and the downstream side of the heating medium mixer 10 are preferably provided with respective temperature measuring devices 81 for continuous measurement of the temperature of the heating medium. These temperature measuring devices make it possible to detect temperature fluctuations on the upstream and downstream sides of the heating medium supply piping 6. Thereafter, signals indicative of temperature fluctuations on each of the upstream and downstream sides of the heating medium are sent to a control device 70. By comparison of these signals, it is possible to monitor the degree of temperature fluctuation suppressing effect performed by the heating medium mixer 10.

Figure 2:
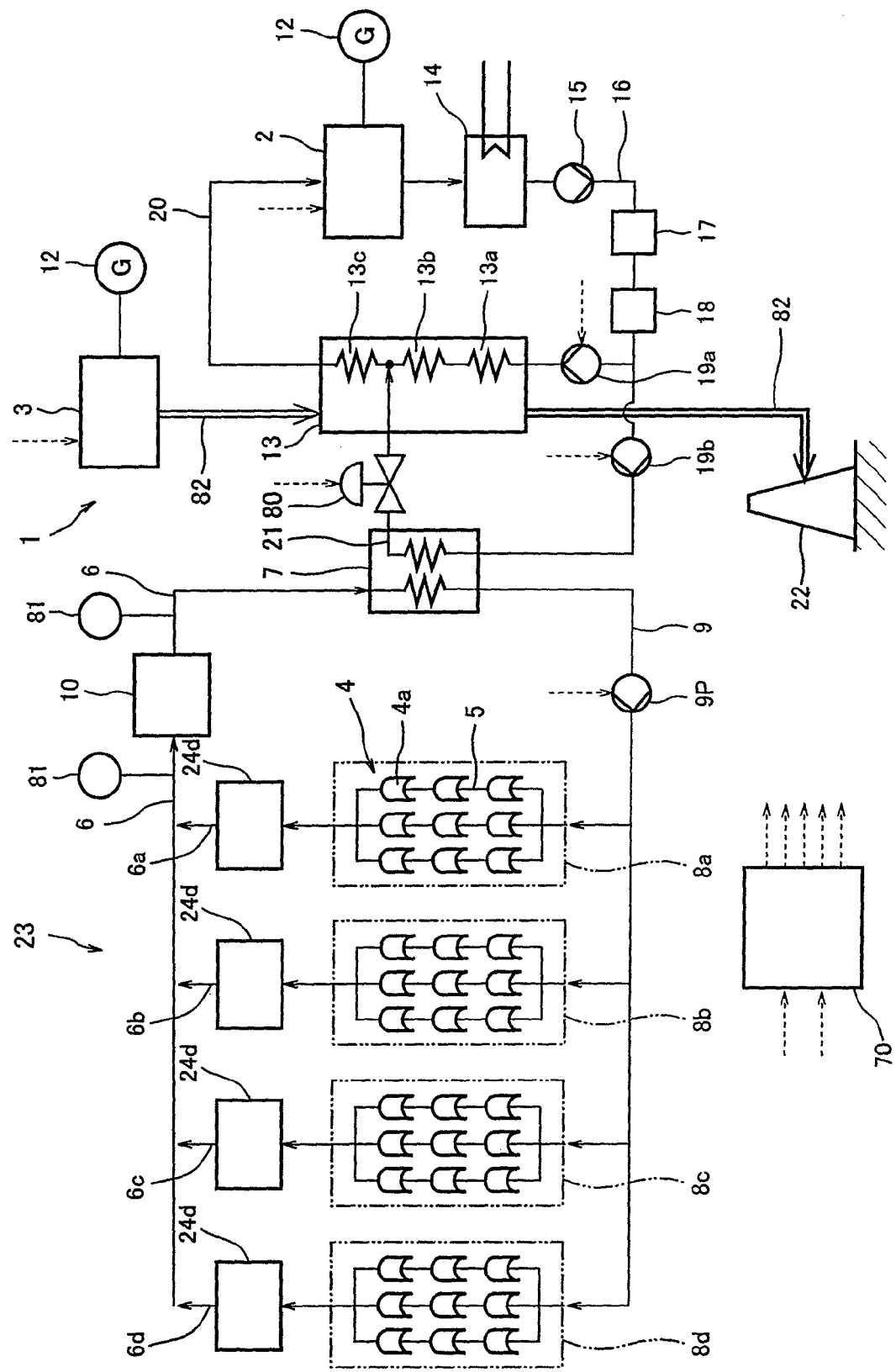
FIG. 2 is a piping diagram schematically illustrating an integrated solar combined cycle electric power generation system as another embodiment of the present invention.

A heating medium supply system 23 of the electric power generation system 1 shown in FIG. 2 is provided with heating medium mixers 24a, 24b, 24c and 24d for the lines of heating medium supply piping 6a, 6b, 6c and 6d, respectively, associated with the respective heat collecting zones 8a, 8b, 8c and 8d, in addition to the above-described heating medium mixer 10, the heating medium mixers 24a, 24b, 24c and 24d being independent of each other. Accordingly, temperature fluctuations of the heating medium can be suppressed on a zone-by-zone basis. Portions of the heating medium, of which temperature fluctuations have been suppressed, are collected together from the respective heat collecting zones 8a, 8b, 8c and 8d and then followed by whole time-lag mixing by the heating medium mixer 10, whereby the temperature of the heating medium is leveled and made uniform. Since the electricity generator is the same as in FIG. 1, description thereof will be omitted.

Figure 3:
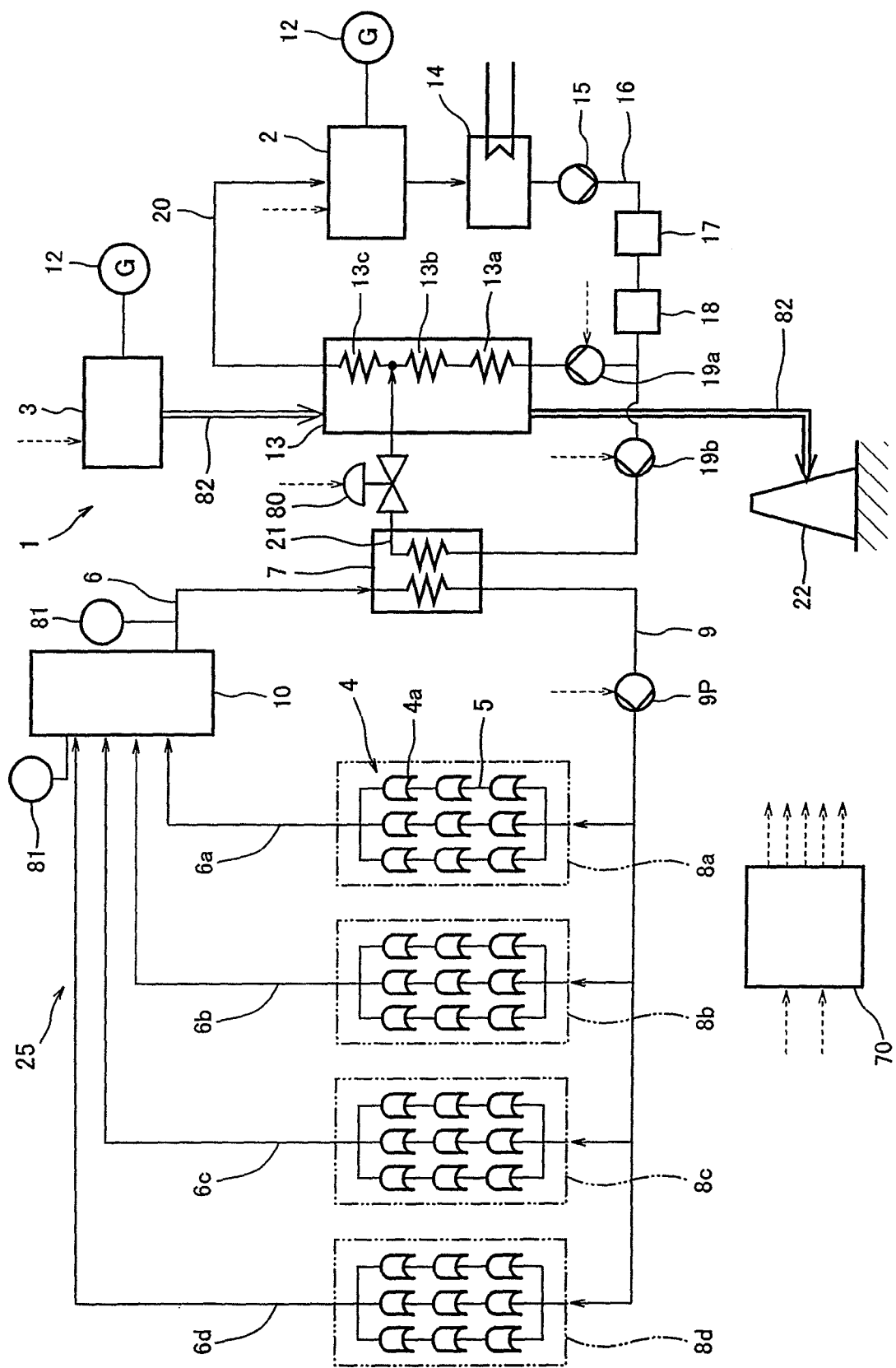
FIG. 3 is a piping diagram schematically illustrating an integrated solar combined cycle electric power generation system as yet another embodiment of the present invention.

In a heating medium supply system 25 of the electric power generation system 1 shown in FIG. 3, the lines of heating medium supply piping 6a, 6b, 6c and 6d associated with the respective heat collecting zones 8a, 8b, 8c and 8d are individually connected to the above-described heating medium mixer 10 without being unified together. Even when the intensity of solar heat in a part of the heat collecting zone is locally and partially lowered steeply because clouds start shading a part of sunlight irradiating a whole installation area and thus giving rise to non-uniformity in solar heat intensity between the partial area being shaded by clouds and the rest area not being shaded by clouds, the above arrangement is capable of lessening the temperature fluctuation of the heating medium which was caused by such non-uniformity on the outlet side of the heat collecting zone, unlike the heating medium supply system 11 shown in FIG. 1. The lines of heating medium supply piping 6a, 6b, 6c and 6d of the heating medium supply system 25 may be provided with the heating medium mixers 24a, 24b, 24c and 24d, respectively, shown in FIG. 2.

Figure 4:
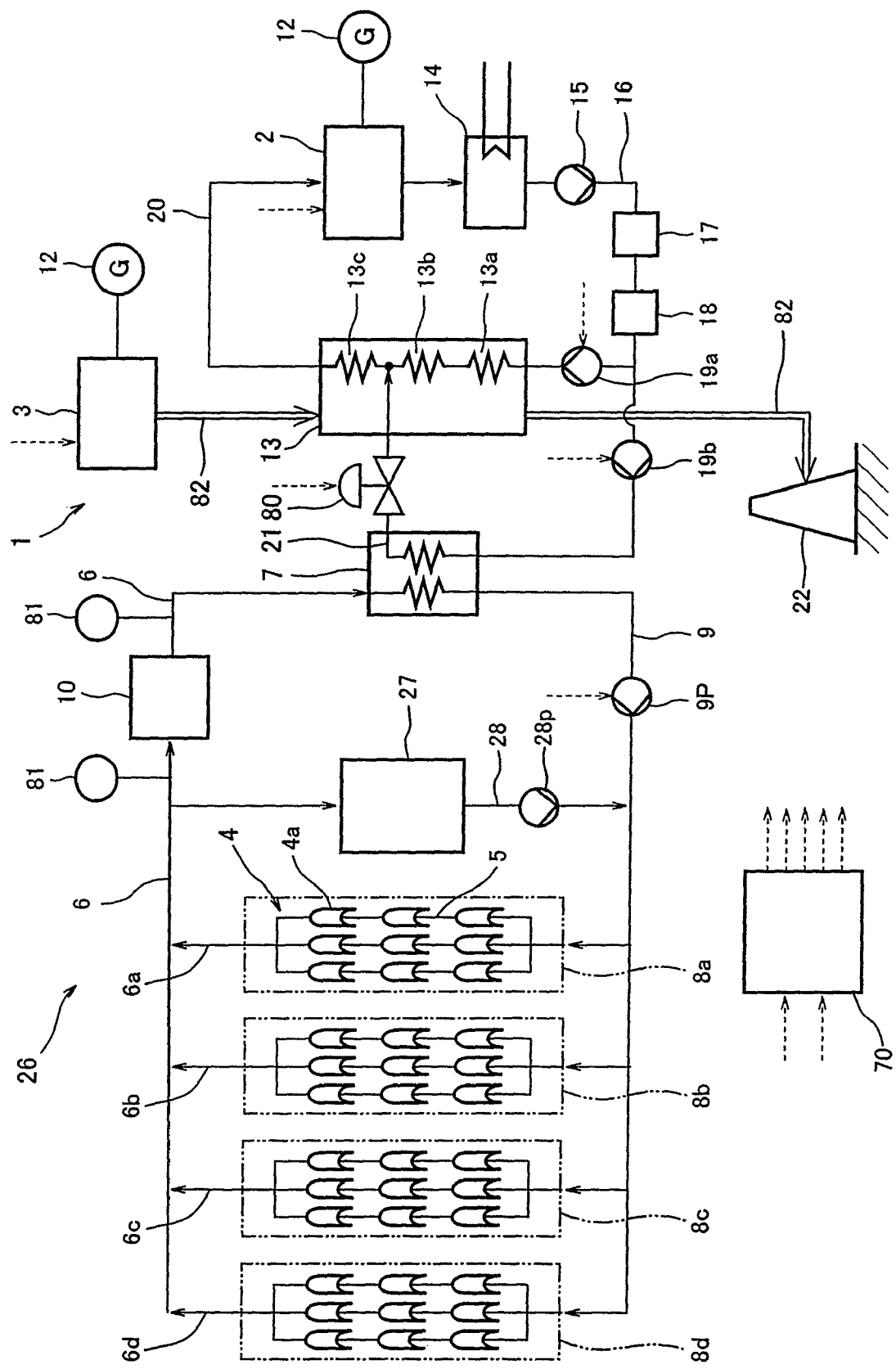
FIG. 4 is a piping diagram schematically illustrating an integrated solar combined cycle electric power generation system as yet another embodiment of the present invention.

A heating medium supply system 26 of the electric power generation system 1 shown in FIG. 4 comprises a heat storage system 27 in addition to the heating medium supply system 11 shown in FIG. 1. The heat storage system 27 comprises a special container which is made to have high heat insulation from the outside thereby to suppress dissipation of thermal energy, and is imparted with high heat accumulating capability by utilizing such a heat storage medium as a molten salt thereby to store the thermal energy of the heating medium.

This heat storage system 27 is provided to a bypass piping 28 which interconnects the upstream side of the heating medium mixer 10 and the return piping 9 so as to bypass the heating medium mixer 10 and the heat exchanging device 7. The bypass piping 28 is also provided with a circulating pump 28P for circulating the heating medium to the heat collecting unit 4 and to the heat storage system 27. The solar heat absorbed by the heating medium thus circulated varies in accordance with the solar position in the sky and becomes zero at night. The electric power generating capability of a solar thermal electric power generation system is generally designed to meet a mean level of solar heat collected. During a certain period of time when the level of absorbed solar heat approximates to a maximum level, the heat storage system 27 accumulates a surplus of solar heat in excess of the mean level. To this end, a portion of the heating medium is introduced into the heat storage system 27 at the time when the collected solar heat exceeds a predetermined mean level, whereby the thermal energy of this portion is stored in the heat storage medium contained in the system 27. The heating medium supply system 23 or 25 shown in FIG. 2 or 3 may be provided with the bypass piping 28 and the heat storage system 27.

With reference to FIGS. 5 to 16, details will be described hereafter of the heating medium mixer functioning as the temperature fluctuation suppressing device for the heating medium. The heating medium mixer has various contrivances in order to time-lag mix the heating medium sufficiently within the mixer. That is, the heating medium mixer is configured to cause a portion of the introduced heating medium to reside within the mixer for a relatively long time and to be mixed with the other portion of the heating medium sufficiently, thereby achieving effective time-lag mixing. Generally speaking, the heating medium mixer causes the introduced heating medium to pass through the plural heating medium passages formed in the mixer in different time lengths to form respective streams and joins together each of the streams having passed through the respective passages, thereby achieving time-lag mixing.

Figure 5:
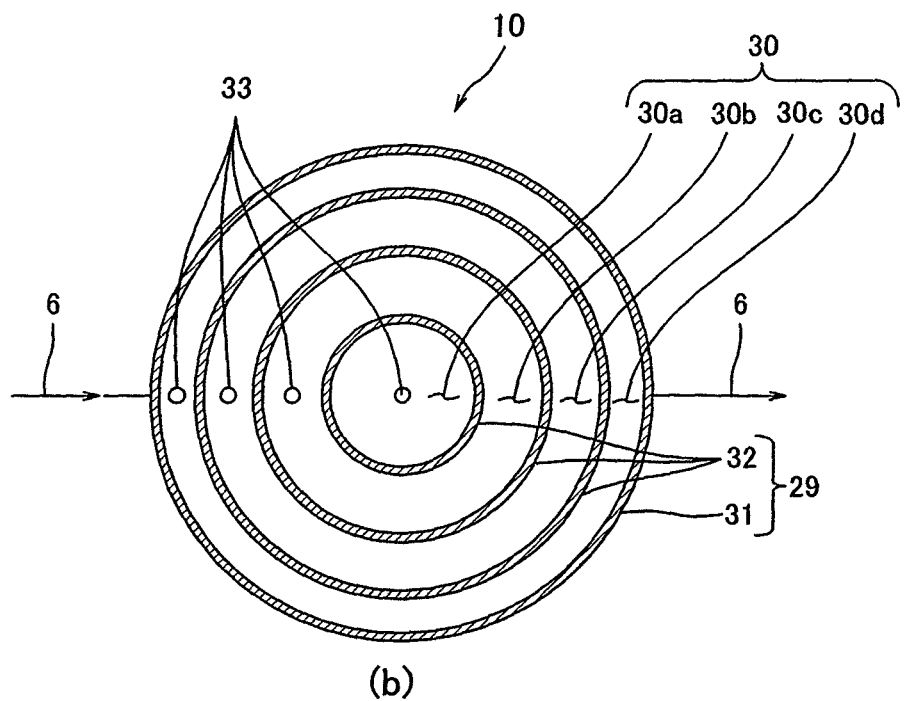
FIG. 5(a) is a vertical sectional view showing an example of a heating medium mixer serving as a temperature fluctuation suppressing device which can be provided in the integrated solar combined cycle electric power generation system shown in FIG. 1, the vertical sectional view being cut by a plane along the central axis of the mixer.
FIG. 5(b) is a sectional view taken on line V-V of FIG. 5(a).
Figure 5:
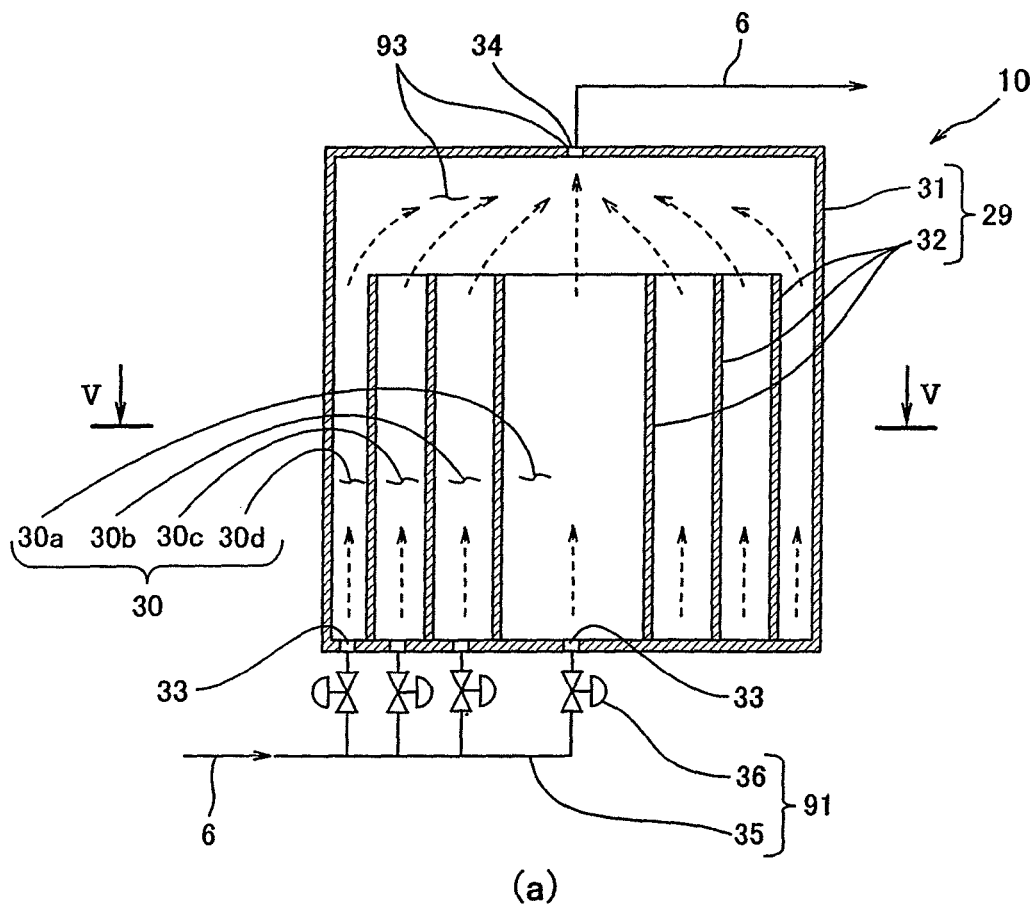

The heating medium mixer 10 shown in FIG. 5 employs a tank 31 having therein cells 30 forming plural heating medium passages as a heating medium passage forming member which form different heating medium passages. In this embodiment, plural cylindrical partition walls 32 having free upper edges are arranged concentrically as spaced from each other on the bottom of the cylindrical tank 31. The space between the peripheral wall of the tank and the cylindrical partition wall 32 adjacent thereto and the spaces between adjacent partition walls 32 form respective of the heating medium passages 30. The height of the upper edge of each cylindrical partition wall 32 is lower than that of the ceiling of the tank 31. The cells (heating medium passages) 30 communicate with each other through the space defined between the ceiling of the tank 31 and the upper edges of the partition walls 32. The bottom of the tank 31 defines heating medium inlet holes 33 at locations corresponding to the respective cells 30, while the ceiling of the tank 31 defines a single heating medium outlet hole 34 connected to the portion of the heating medium supply piping 6 located downstream of the mixer 10.

The inlet member 91 comprises piping 35 having branch portions branched off from the upstream side portion of the heating medium supply piping 6 and connected to each of the inlet holes 33, and flow control valves 36 each provided to a respective one of the branch portions of the piping 35 for controlling the flow rate of the heating medium flowing into the mixer 10. As has been described with reference to FIG. 3, it is possible that the number of the cells 30 is equal to that of the heat collecting zones 8 and independent lines of heating medium supply piping are provided to interconnect the heat collecting zones 8 and the cells 30 in a one-to-one relationship. This feature of connection is applicable to various heating medium mixers to be described later.

The outlet member 93 can be considered to comprise the aforementioned outlet hole 34, and a portion of the tank 31 lying above the upper edges of the cylindrical partition walls 32. That is, the outlet member 93 is the portion of the tank 31 which defines the space between the ceiling of the tank 31 and the upper edges of the partition walls 32 and includes the outlet hole 34. Streams of the heating medium, which have passed through the respective heating medium passages 30 separately, are joined and mixed together in the outlet member 93. Though the heating medium passage forming member shown in FIG. 5 has four heating medium passages 30a, 30b, 30c and 30d, there is no particular limitation on the number of heating medium passages as long as the number is not less than two. A larger number is preferable from the viewpoint of effective time-lag mixing of the heating medium.

The location at which the inlet member is connected to the heating medium passages 30 is not limited to the bottom of the tank 31 as is in the present embodiment. Since each heating medium passage 30 extending from the inlet member 91 to the outlet member 93 preferably has a larger length, the inlet member 91 is preferably connected at the bottom of the tank 31 as shown when the heating medium passages 30 have upper open ends for communication with the outlet member 93.

In the present embodiment, all the cells have the same volume. Under this condition, the openings of the flow control valves 36 are controlled to cause the heating medium to flow into the different cells 30 at different flow rates. As a result, different time periods are required for portions of the heating medium that start flowing into the respective cells 30a, 30b, 30c and 30d at a certain point of time to reach the outlet member 93. This results in time-lag mixing of the streams of the heating medium joined together after flowing out of the respective cells, so that the temperature fluctuation of the heating medium is suppressed. This effect is described more specifically hereafter.

With the flow control valves adjusted so that the flow rate ratio between portions of the heating medium flowing into respective of the first to nth heating medium passages having equal volume W is 1:2:3: . . . n, the first portion of the heating medium flowing into the first heating medium passage at a flow rate $V/\{n\cdot(n+1)/2\}$ at a certain point of time flows out of the first heating medium passage after a lapse of time $t_1 = W\cdot n\cdot(n+1)/2V$, wherein V represents the flow rate of the total heating medium passing through the inlet member 91. The second portion of the heating medium flowing into the second heating medium passage at a flow rate $2V/\{n\cdot(n+1)/2\}$, at the same time when the first portion flows into the first heating medium passage, flows out of the second heating medium passage after lapse of time $t_2 = W\cdot n\cdot(n+1)/4V = \frac{1}{2}\times t_1$. The nth portion of the heating medium flowing into the nth heating medium passage at a flow rate $n\cdot V/\{n\cdot(n+1)/2\}$, at the same time when the first portion flows into the first heating medium passage, flows out of the nth heating medium passage after lapse of time $t_2 = 1/n \times t_1$.

Each of the portions of the heating medium flowing into the respective heating medium passage at the same time, namely, at substantially equal temperatures, flows out of the respective heating medium passage after a lapse of different time periods and is joined together and mixed in the outlet member 93. As a result, the heating medium having flown into the heating medium mixer 10 is effectively time-lag mixed, so that temperature fluctuations of the heating medium are suppressed. The outlet member 93 (for example, the portion within the tank 31 situated above the heating medium passages 30) may additionally be provided with a mixing device or a stirring device for further mixing the streams of the heating medium having flown out of the respective heating medium passages with time-lags. Such a stirring device may include a rotor such as a screw propeller, and a forced jetting device. An electric motor or the like for driving, such a rotor, is preferably located outside the tank or the heating medium passages. Instead of the rotor, such a static member or construction may be fixed as to change the flow condition of the heating medium. For example, stationary blades may be attached to the inner wall surface of the flow passage.

While the flow rate ratio between the portions of the heating medium flowing into the respective heating medium passages is a ratio of integers in the above-described embodiment, any desired flow rate ratio can be selected without limitation to such a feature. Also, portions of the heating medium may be passed through some of the heating medium passages at equal flow rate when necessary.

While the plural heating medium passages of the heating medium mixer 10 shown in FIG. 5 have equal volume and the portions of the heating medium are made to flow into the respective heating medium passages at different flow rates, it is possible that the plural heating medium passages have different kinds of volume and the portions of the heating medium are made to flow into the respective heating medium passages at equal flow rate, as is described hereafter.

Figure 6:
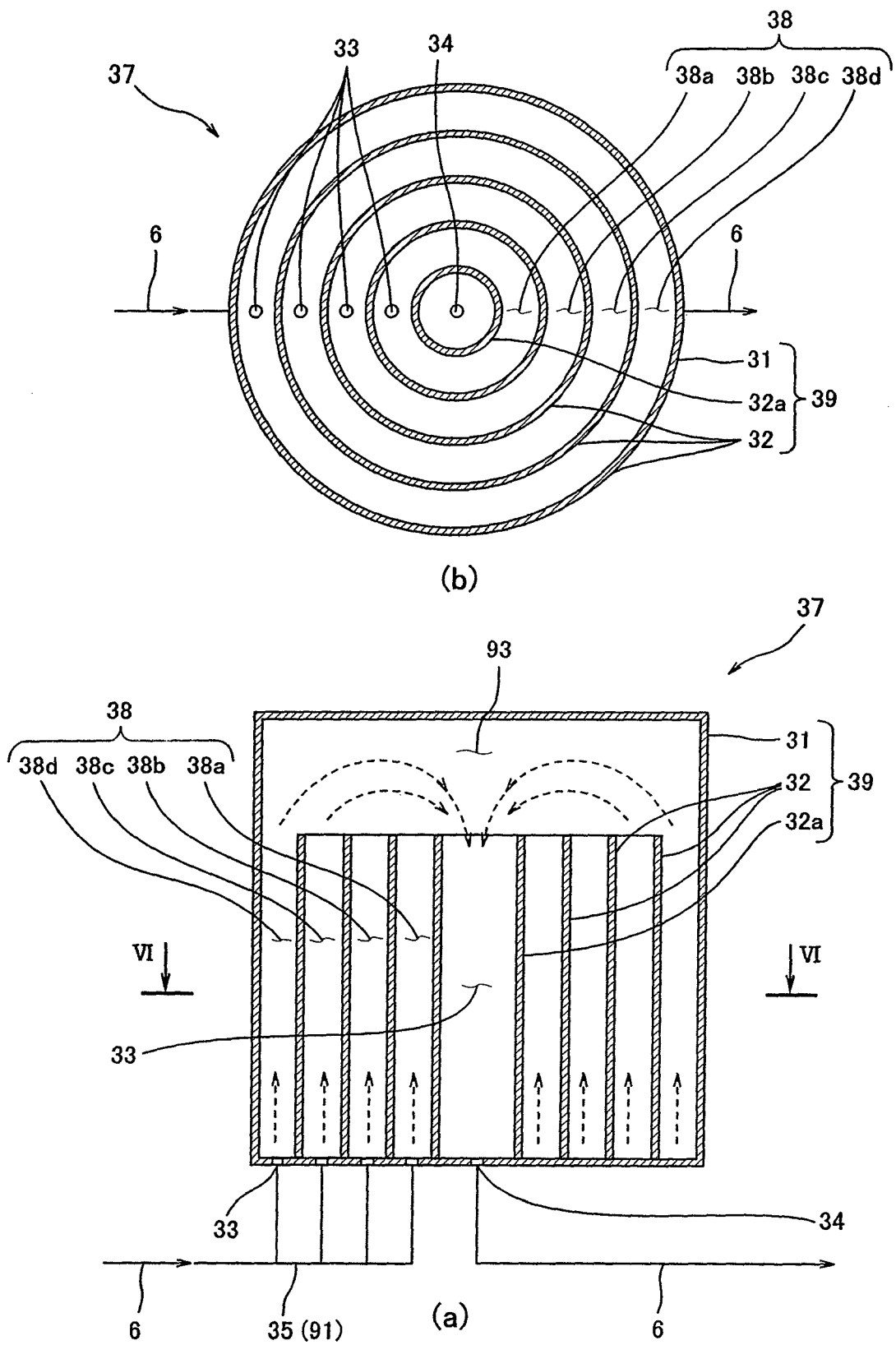
FIG. 6(a) is a vertical sectional view showing another example of a heating medium mixer serving as a temperature fluctuation suppressing device which can be provided in the integrated solar combined cycle electric power generation system shown in FIG. 1, the vertical sectional view being cut by a plane along the central axis of the mixer.
FIG. 6(b) is a sectional view taken on line VI-VI of FIG. 6(a).

A heating medium mixer 37 shown in FIG. 6 has a heating medium passage forming member 39 forming plural cells 38a, 38b, 38c and 38d having different kinds of volume. Like the heating medium passage forming member shown in FIG. 5, the heating medium passage forming member 39 has the tank 31 in which the plural cylindrical partition walls 32 having free upper edges are arranged concentrically as spaced from each other on the bottom of the tank 31. The space between the peripheral wall of the tank 31 and the cylindrical partition wall 32 adjacent thereto and the spaces between adjacent partition walls 32 form respective of heating medium passages 38. As will be described later, the space defined internally of the innermost cylindrical partition wall 32a forms part of a flow passage through which joined streams of the heating medium flow out of the mixer. The upper edge of each cylindrical partition wall 32 is downwardly spaced from the ceiling of the tank 31.

Unlike the cells in the heating medium mixer shown in FIG. 5, the cells 38a, 38b, 38c and 38d are formed to have a volume ratio of 1:2:3:4. The inlet member 91 has the piping 35 having branch portions branched off from the upstream side portion of the heating medium supply piping 6 and connected to respective of the inlet holes 33 of the tank 31, but is not provided with any one of the flow control valves 36. Thus, the heating medium mixer 37 is configured to allow the heating medium to flow into all the heating medium passages (cells) 38 at substantially equal flow rate.

The outlet hole 34 of the tank 31 is located at the center of the bottom of the tank 31 corresponding to the internal space defined by the innermost cylindrical partition wall 32a. The internal space defined by the innermost cylindrical partition wall 32a forms part of the outlet member 93. Portions of the heating medium flowing into the cells 38a, 38b, 38c and 38d pass through the space defined above all the cells 38 within the tank 31 and the internal space of the innermost cylindrical partition wall 31a and then flow out of the outlet hole 34 to the downstream side portion of the heating medium supply piping 6. Thus, the outlet member 93 can be considered to comprise the portion of the tank 31 lying above the cells 38, the internal space of the innermost cylindrical partition wall 32a, and the outlet hole 34. That is, the outlet member 93 comprises the portion of the tank 31 defining the space between the ceiling of the tank 31 and the upper edges of the partition walls 32 and including the outlet hole 34, and the innermost cylindrical partition wall 32a.

The streams of the heating medium, which have passed through the respective heating medium passages 38 separately, are joined and mixed together in the outlet member 93. The subject heating medium mixer 37 also may be provided with a mixing device or stirring device at the outlet member 93 (for example, the portion within the tank 31 lying above the cells 38 or the inside of the innermost cylindrical partition wall 32a).

As in the former embodiment, the heating medium flowing out of the heating medium mixer 37 is time-lag mixed and, hence, temperature fluctuations thereof are suppressed. This effect will be described more specifically.

For example, the flow rate of the total heating medium passing through the inlet member 91 is V and the volume ratio between the first to nth heating medium passages is 1:2:3: . . . n. The first portion of the heating medium that flows into the first heating medium passage having a volume W at a flow rate v=V/n at a certain point of time flows out of the first heating medium passage after a lapse of time $t_1=1$ W/v. The second portion of the heating medium that flows into the second heating medium passage having a volume 2 W at equal flow rate v=V/n, at the same time when the first portion flows into the first heating medium passage, flows out of the second heating medium passage after a lapse of time $t_2=2$ W/v=$2t_1$. The nth portion of the heating medium that flows into the nth heating medium passage having a volume nW at a flow rate v=V/n, at the same time when the first portion flows into the first heating medium passage, flows out of the nth heating medium passage after a lapse of time $nt_1$.

In this way, each of the portions of the heating medium flowing into the respective heating medium passage at the same time, namely, at substantially equal temperatures, flows out of the respective heating medium passages after a lapse of different time periods and is joined together and mixed in the outlet member 93. As a result, the heating medium having flown into the heating medium mixer 10 is effectively time-lag mixed, so that temperature fluctuations of the heating medium are suppressed.

While the volume ratio between the heating medium passages is a ratio of integers in the above-described embodiment, any desired volume ratio can be selected without limitation to such a feature. Also, some of the heating medium passages may have equal volume when necessary. Though the internal space of the innermost cylindrical partition wall 32a forms an outflow passage through which the heating medium flows out of the mixer, there is no limitation to such a feature. It is possible that the outermost cell (the nth passage) or an intermediate cell forms the outflow passage.

The shape of the above-described tank 31 is not limited to the cylindrical shape. Any other various shapes can be employed including a prismatic shape, a spherical shape in addition to the basic cylindrical shape. Though the cylindrical partition walls 32 forming the cells in the tank 31 are arranged concentrically within the tank 31, the partition walls 32 may be arranged eccentrically without limitation to such an arrangement. Each of the heating medium passages need not have a uniform sectional shape in the direction of the flow of the heating medium. The sectional shape may be scaled up or down, or each passage need not be straight but may be curved or meandered. The heating medium passage forming member, the structure of the inlet member and the outlet member are not limited to those as shown in FIGS. 5 and 6, but any suitable structures can be employed.

Figure 7:
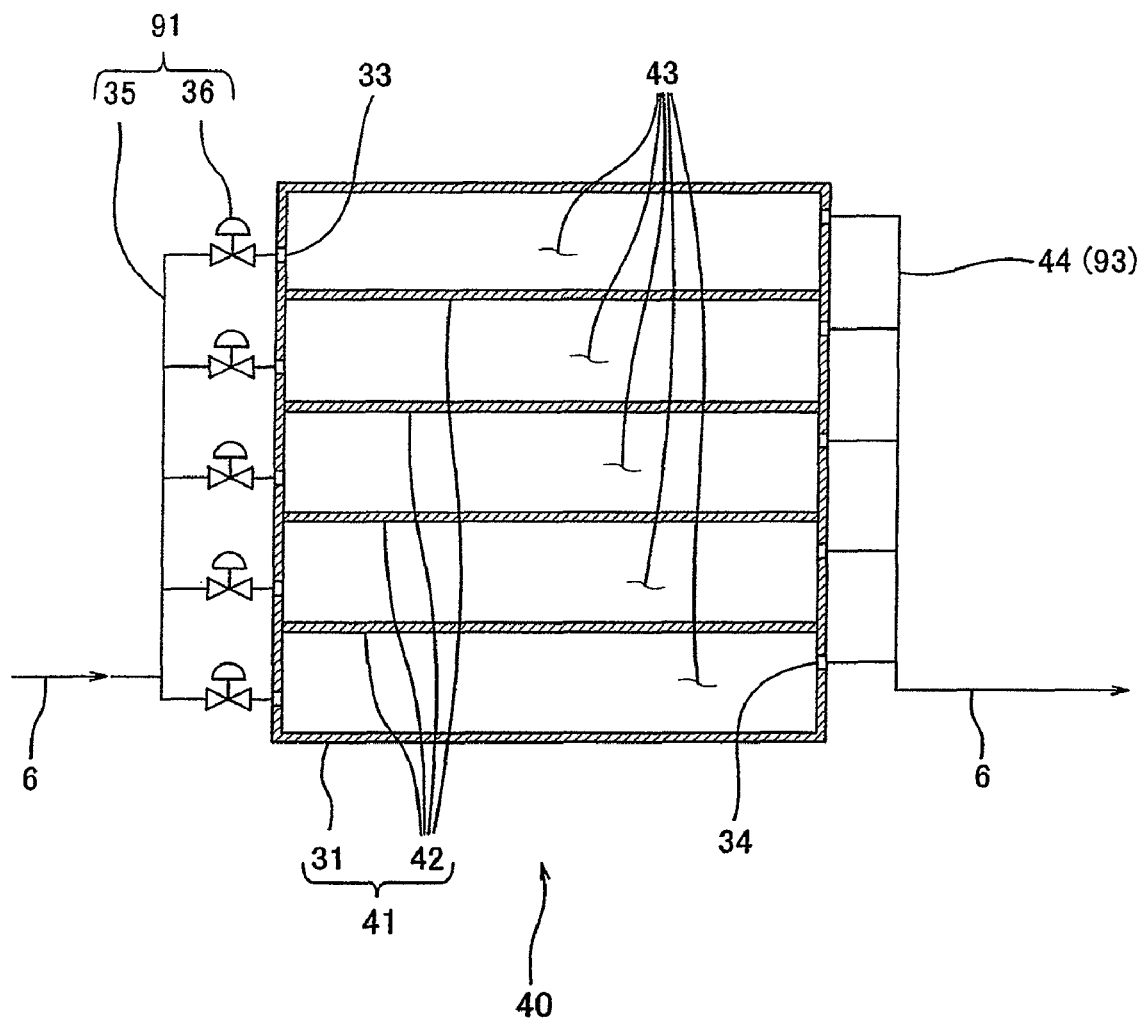
FIG. 7 is a vertical sectional view showing yet another example of a heating medium mixer which can be provided in the integrated solar combined cycle electric power generation system shown in FIG. 1.

For example, a heating medium passage forming member 41 of a heating medium mixer 40 shown in FIG. 7 includes plural lateral partition walls 42 spaced from each other vertically to partition the internal space of the tank 31 into heating medium passages (cells) 43. The lateral partition walls 42 are so spaced from each other that all the cells 43 have substantially equal volume. Each of the cells 43 has one end defining the inlet hole 33 and an opposite end defining the outlet hole 34. The inlet hole 33 and the outlet hole 34 are not opposed to each other, and the outlet hole 34 is located offset from the central axis of the inlet hole 33. This arrangement is capable of preventing a portion of the heating medium flowing into each cell 43 through the inlet hole 33 from flowing out through the outlet hole 34 in a very short time thereby allowing the heating medium to reside within the cell 43 as long as possible. Though not shown, such offset positioning of the outlet hole 34 from the central axis of the inlet hole 33 is applicable to the cells or tanks shown in other figures without limitation to the heating medium passage forming member 41 shown in FIG. 7.

While the cells 43 are partitioned with the lateral partition walls 42, the present invention is not limited to this arrangement. For example, it is possible to use vertically extending partition walls to partition cells or form square cells partitioned in a matrix pattern or cells partitioned to form a honeycomb structure. Alternatively, partitions may be made to form cells arranged radially like a sectional view of a citrus fruit.

The inlet member 91, which is the same as that shown in FIG. 5, comprises the piping 35 having branch portions branched off from the upstream side portion of the heating medium supply piping 6 and connected to each of the inlet holes 33, and the flow control valves 36 each provided to a respective one of the branch portions of the piping 35. The openings of the flow control valves 36 are controlled so as to allow portions of the heating medium to flow into the respective cells 43 at different flow rates. As shown in FIG. 3, it is possible that independent lines of the heating medium supply piping are provided to connect the heat collecting zones directly to each of the cells 43 of the heating medium passage forming member 41 without unification of the lines of piping associated with the respective heat collecting zones.

The outlet member 93 comprises piping 44 connected to the plural outlet holes 34 and unified for connection with the downstream side portion of the heating medium supply piping 6. Streams of the heating medium that have flown out of the respective cells 43 with time-lags begin being mixed in the unified portion of the piping 44. To accelerate mixing of the heating medium, the outlet member 93 (the unified piping portion for example) may be provided with a mixing device or stirring device. As described with respect to the heating medium mixer 10 shown in FIG. 5, the heating medium passage forming member 41 also allows the heating medium having flown into the heating medium mixer 40 to be effectively time-lag mixed, thereby suppressing temperature fluctuations of the heating medium.

Even with the heating medium mixer 40 having plural cells vertically arranged in tiers as shown in FIG. 7, it is possible that portions of the heating medium are made to flow into the heating medium passages at substantially equal flow rate and the plural heating medium passages have different kinds of volume. In this case, the inlet member need not necessarily be provided with any one of the flow control valves. Like the heating medium mixer 37 described with reference to FIG. 6, the heating medium mixer 40 can effectively time-lag mix the heating medium having flown thereinto, thereby suppressing temperature fluctuations of the heating medium.

The heating medium passage forming member is not limited to any one of the heating medium passage forming members 29, 39 and 41 of the type having plural cells within a single tank as shown in FIGS. 5 to 7, but may comprise plural independent containers.

Figure 8:
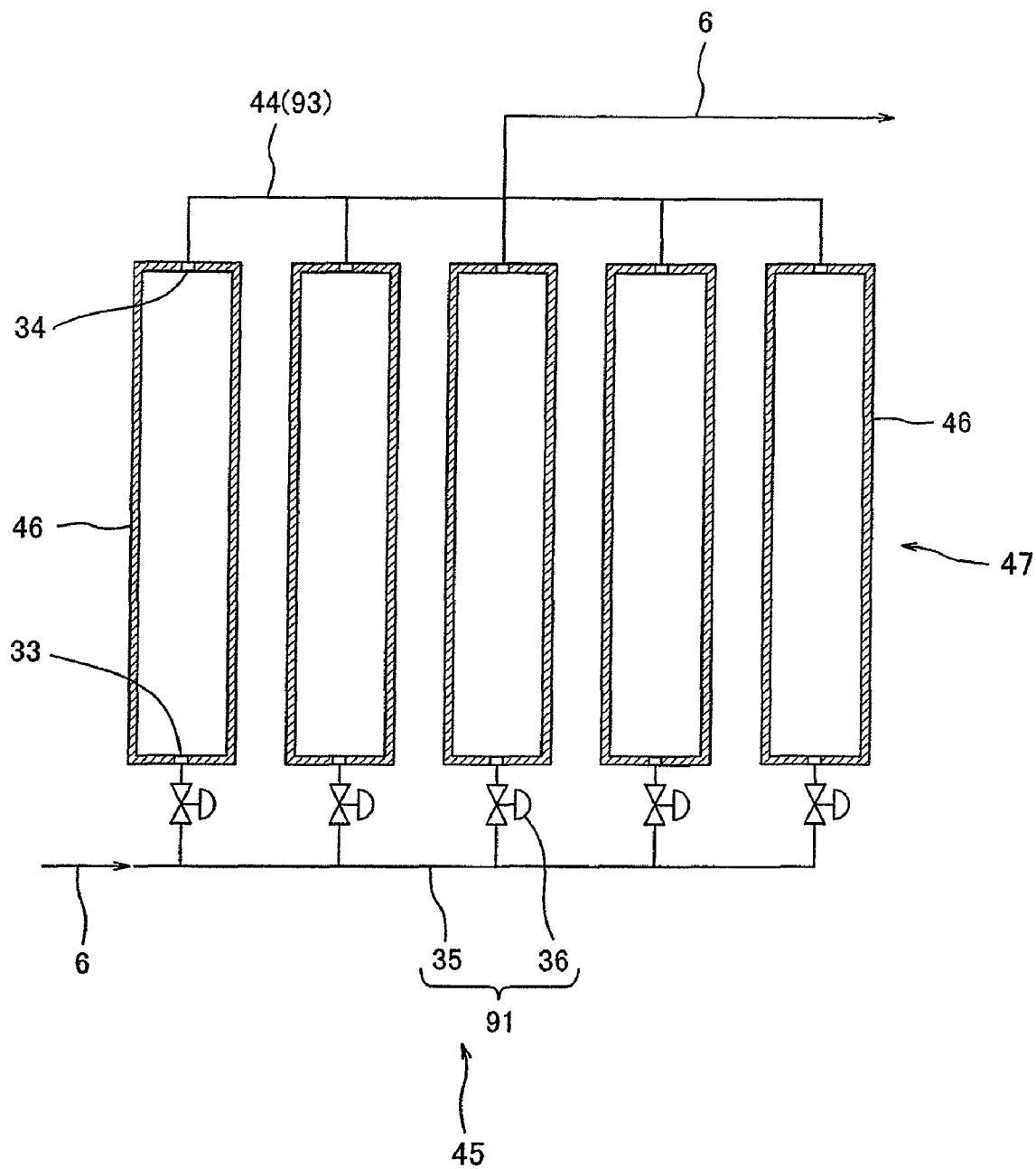
FIG. 8 is a vertical sectional view showing yet another example of a heating medium mixer which can be provided in the integrated solar combined cycle electric power generation system shown in FIG. 1.

FIG. 8 shows a heating medium mixer 45 having a heating medium passage forming member 47 comprising plural independent containers 46 as mentioned above. The containers 46 form respective cells (heating medium passages) and have substantially equal volume. Each of the containers 46 has the inlet hole 33 at its lower end (alternatively at its upper end or side wall) and the heating medium outlet hole 34 at its upper end (alternatively at its lower end or side wall).

The inlet member 91, which is the same as that shown in FIG. 5 or 7, comprises the piping 35 having branch portions branched off from the upstream side portion of the heating medium supply piping 6 and connected to respective of the inlet holes 33, and the flow control valves 36 each provided to a respective branch portion of the piping 35. The respective flow control valve 36 is controlled to allow each portion of the heating medium to flow into the respective cell 46 at a different flow rate. The outlet member 93, which is the same as that shown in FIG. 7, comprises the piping 44 connected to the plural outlet holes 34 and unified for connection with the downstream side portion of the heating medium supply piping 6. Streams of the heating medium that have flown out of the respective cells 46 with time-lags begin being mixed in the unified portion of the piping 44. To accelerate mixing of the heating medium, the outlet member 93 (the unified portion of the piping for example) may be provided with a mixing device or a stirring device. Like the heating medium mixer 10 described with reference to FIG. 5, the heating medium mixer 45 is capable of effectively time-lag mixing the heating medium having flown thereinto, thereby suppressing temperature fluctuations of the heating medium. Since each heating medium passage is formed by a single independent container, it is possible to eliminate partition walls for partitioning the cells and thereby to facilitate manufacturing of heating medium mixers.

Even with the heating medium mixer 45 having the plural independent containers 46 as the heating medium passages as shown in FIG. 8, it is possible that the heating medium is made to flow into the containers at substantially equal flow rates and the containers have different kinds of volume. In this case, the provision of the flow control valves on the inlet member is not particularly required. Like the heating medium mixer 37 described with reference to FIG. 6, the heating medium mixer 45 is capable of effectively time-lag mixing the heating medium having flown thereinto, thereby suppressing temperature fluctuations of the heating medium. There is not limitation of the shape of each container 46. Each container 46 may have any of various shapes such as a cylindrical shape, a prismatic shape, and a spherical shape. Since a single independent container forms each of the heating medium passages, the volume of the containers can easily be made different. The containers can be formed by using piping sections having different diameters or different lengths, or like materials.

Figure 9:
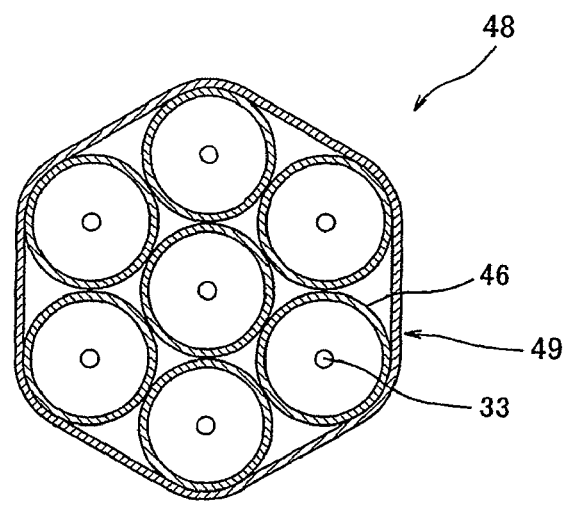
FIG. 9(a) is a front elevational view showing yet another example of a heating medium mixer serving which can be provided in the integrated solar combined cycle electric power generation system shown in FIG. 1.
FIG. 9(b) is a sectional view taken on line IX-IX of FIG. 9(a).
Figure 9:
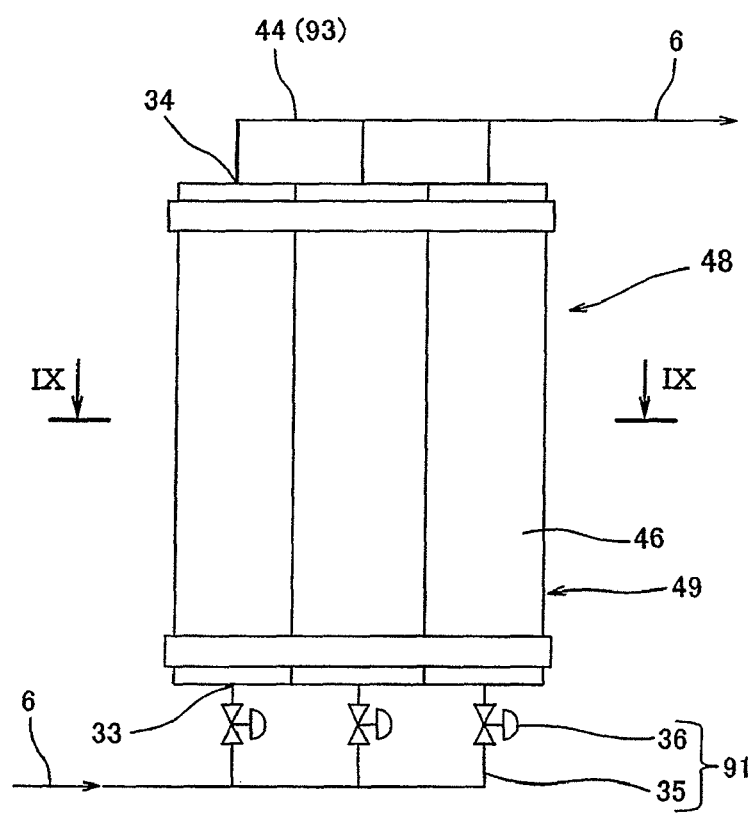

A heating medium mixer 48 shown in FIG. 9 has a heating medium passage forming member 49 comprising the containers 46 shown in FIG. 8 which are assembled together. The heating medium mixer 48 has substantially the same structure as the heating medium mixer 45 shown in FIG. 8 except that the plural containers 46 are compactly assembled. For this reason, the same reference characters are used to designate similar parts throughout FIGS. 8 and 9 in order to omit detailed description thereof. This heating medium mixer 48 can save the installation space therefor.

Figure 10:
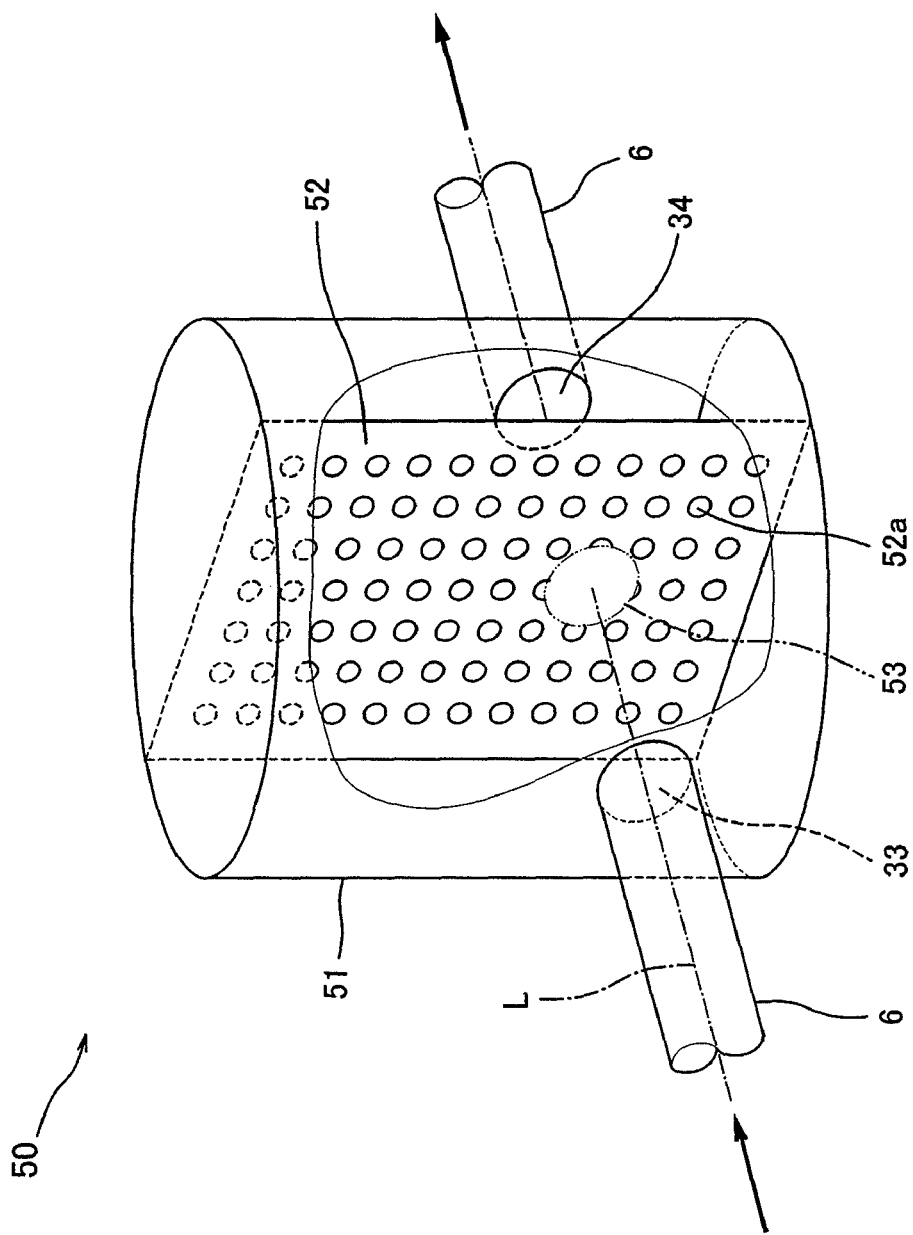
FIG. 10 is a partially cutaway perspective view showing yet another example of a heating medium mixer which can be provided in the integrated solar combined cycle electric power generation system shown in FIG. 1.
Figure 11:
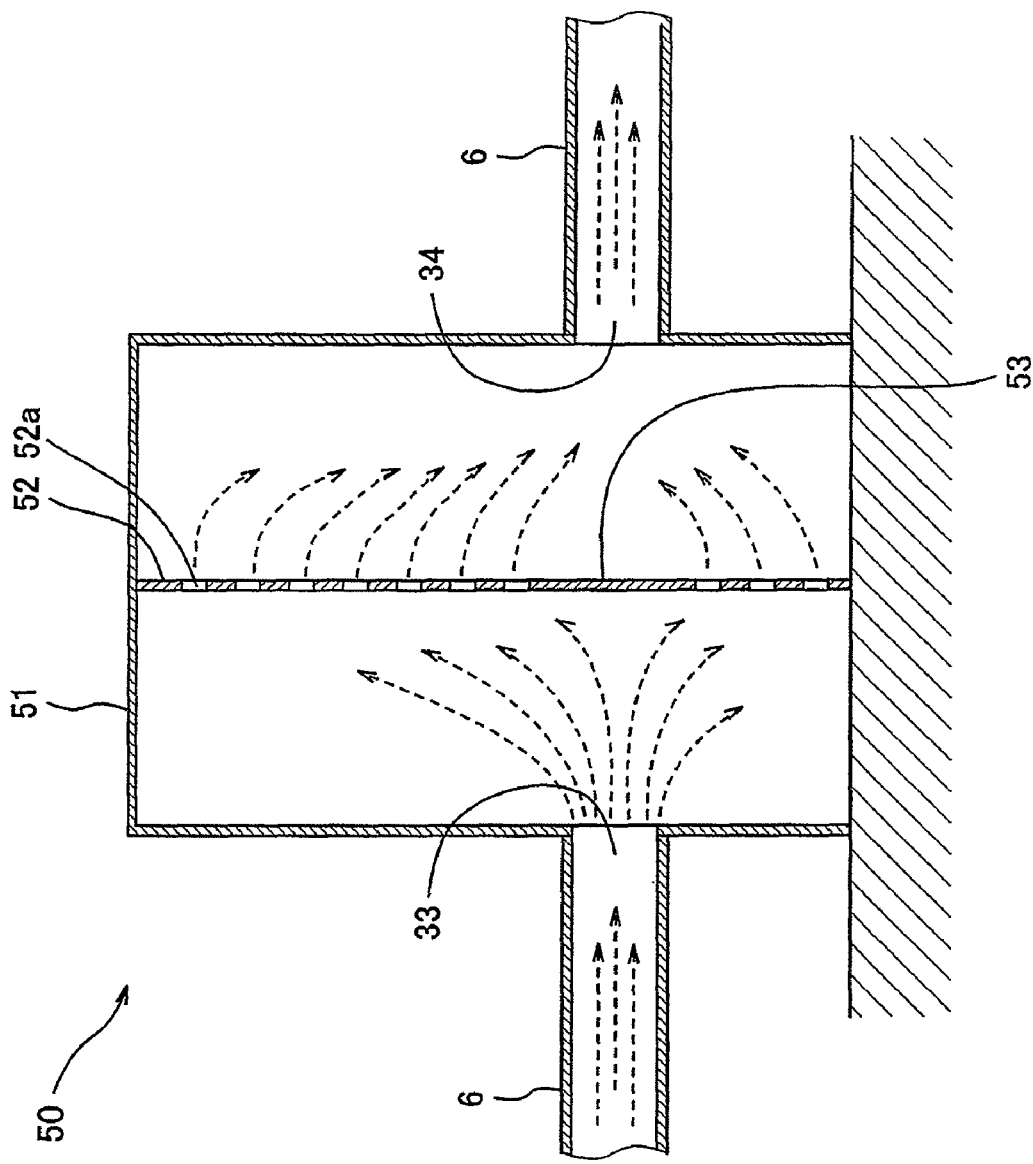
FIG. 11 is a vertical sectional view cut by a plane along the central axis of the heating medium mixer shown in FIG. 10.

A heating medium mixer 50 shown in FIGS. 10 and 11 is provided with a perforated plate 52 having multiple perforations within a tank 51. FIG. 10 is a partially cutaway perspective view of the heating medium mixer 50 and FIG. 11 is a vertical sectional view of the mixer 50. The tank 51 has a peripheral wall defining the inlet hole 33 and the outlet hole 34, the inlet hole 33 being connected to the upstream side portion of the heating medium supply piping 6, the outlet hole 34 being connected to the downstream side portion of the heating medium supply piping 6. The aforementioned perforated plate 52 is positioned vertically to divide the internal space of the tank 51 into a space on the inlet hole 33 side and a space on the outlet hole 34 side. In the present embodiment, the inlet hole 33 and the outlet hole 34 are formed at opposite locations on the peripheral wall of the tank 51, with the perforated plate 52 positioned vertically to cross an imaginary line interlinking the inlet hole 33 and the outlet hole 34 perpendicularly. The present invention is not limited to this structure.

In the heating medium mixer 50, the inlet member comprises the inlet hole 33 and a portion of the tank 51 connecting the inlet hole 33 to the heating medium supply piping 6, while the outlet member comprises the outlet hole 34 and a portion of the tank 51 connecting the outlet hole 34 to the heating medium supply piping 6.

The perforated plate 52 has a region free of any perforation, the region being situated around a point at which an imaginary line L extending from the center of the inlet hole 33 along the central axis of the portion connecting the inlet hole 33 to the heating medium supply piping 6 (hereinafter will be referred to as the central axis of the inlet hole 33) intersects the perforated plate 52. This region will be referred to as perforation-free region 53 (encircled with a phantom line in the figure). The perforation-free region 53 is provided to prevent a portion of the heating medium flowing into the tank 51 through the inlet hole 33 from reaching the outlet hole 34 in a very short time, thereby allowing the heating medium to reside within the tank 51 as long as possible. As most of the heating medium having flown into the tank 51 through the inlet hole 33 impinges upon the perforation-free region and then passes through the perforations 52a, the heating medium resides within the tank for a prolonged time. Though the perforation-free region 53 shown in FIG. 10 has approximately the same shape and area as the inlet hole 33 or the outlet hole 34 illustratively, the perforation-free region 53 may have a larger area.

The tank 51 and the perforated plate 52 form the heating medium passage forming member. That is, the multiple perforations 52a of the perforated plate 52 form respective heating medium passages. The heating medium having flown into the tank 51 through the inlet hole 33 reaches the outlet hole 34 through different perforations 52a. In this case, the heating medium passing through different perforations 52a draws streamlines which are different in direction and length from each other. Thus, the different perforations can be regarded as different heating medium passages from the viewpoint of time-lag mixing.

With the heating medium mixer 50, the heating medium is time-lag mixed in the space on the inlet hole side defined just upstream of the perforated plate 52 and then further time-lag mixed in the space on the outlet hole side. For this reason, temperature fluctuations of the heating medium can be suppressed effectively.

The perforated plate 52 may be provided inside each cell 30, 38, 43 or each container 46 in each of the heating medium passage forming members 29, 39, 41, 47 and 49 shown in FIGS. 5 to 9. By so doing, it is possible to time-lag mix the heating medium within each heating medium passage.

Figure 12:
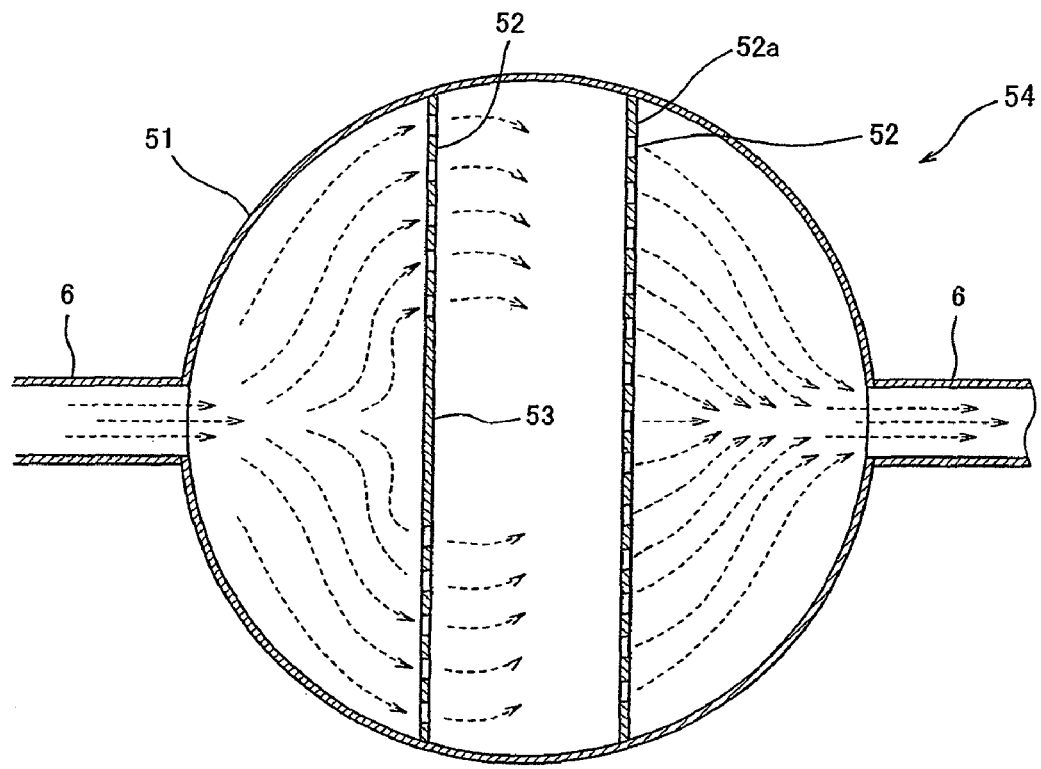
FIG. 12(a) is a vertical sectional view showing yet another example of a heating medium mixer which can be provided in the integrated solar combined cycle electric power generation system shown in FIG. 1, the vertical sectional view being cut by a plane along the central axis of the mixer.
FIG. 12(b) is a sectional view taken on line XII-XII of FIG. 12(a).
Figure 12:
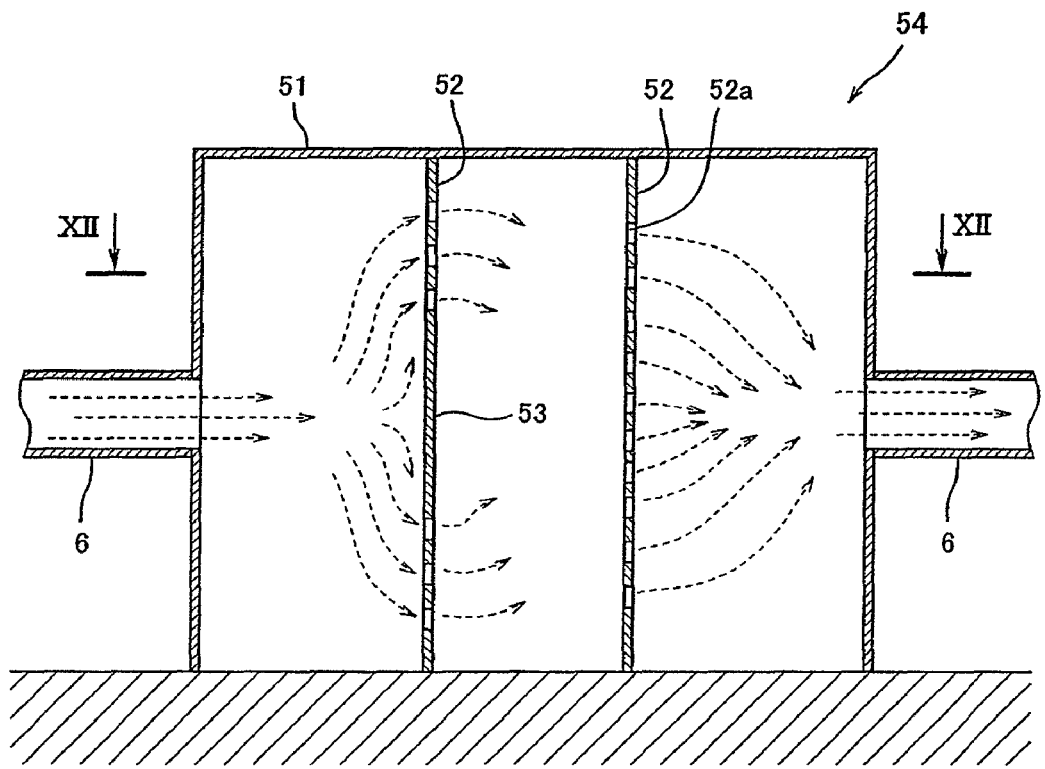

A heating medium mixer 54 shown in FIG. 12 is provided with two (or three or more) parallel perforated plates 52 spaced from each other within the tank 51. Accordingly, the internal space of the tank 51 is divided into three spaces by the perforated plates 52. As compared to the heating medium mixer 50 shown in FIG. 10, the subject heating medium mixer 54 causes the heating medium to be further time-lag mixed in the space between the two perforated plates 52 and can suppress temperature fluctuations of the heating medium more effectively. The perforated plate located adjacent to the outlet hole 34 may be provided with the perforation-free region 53.

Figure 13:
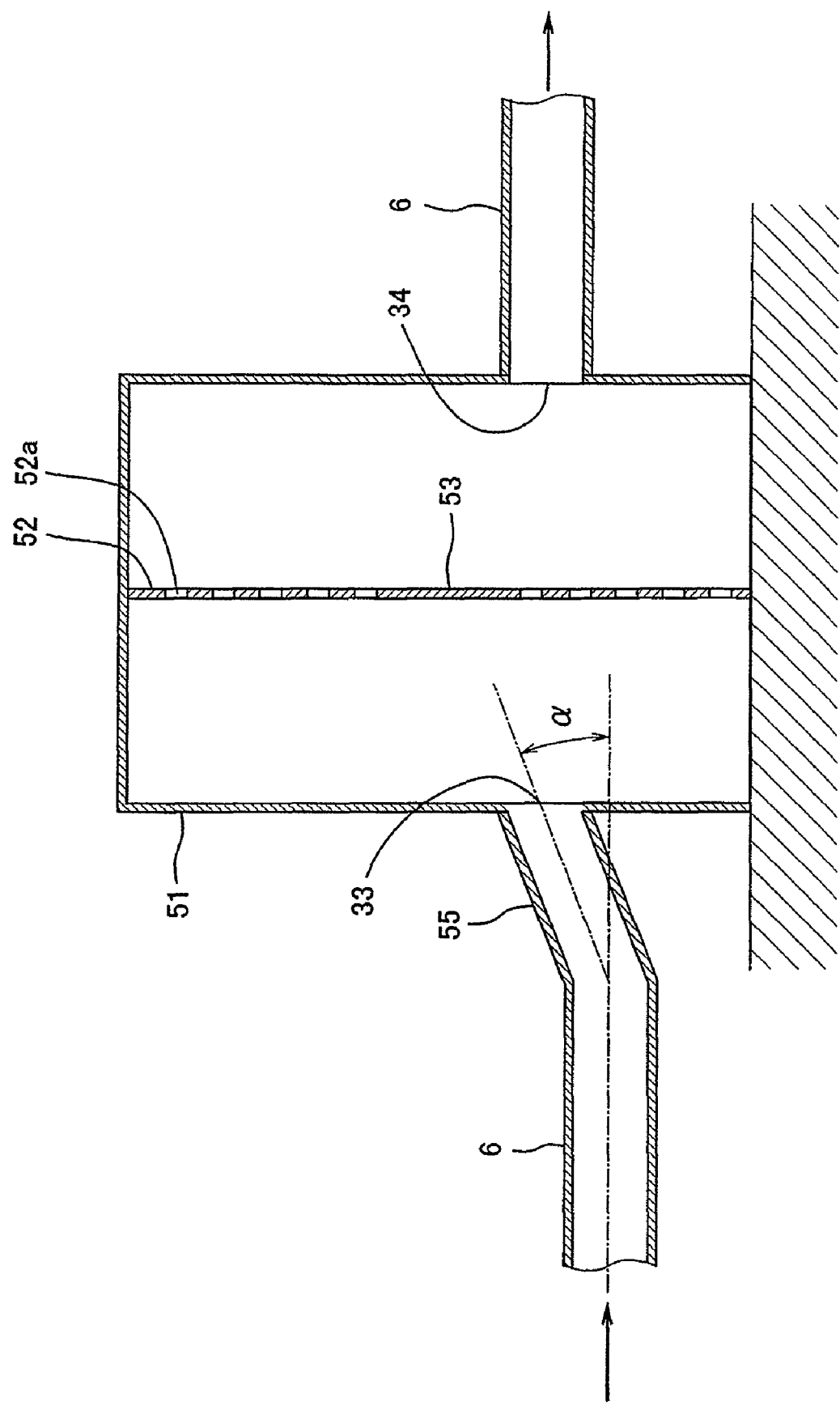
FIG. 13 is a vertical sectional view showing yet another example of a heating medium mixer which can be provided in the integrated solar combined cycle electric power generation system shown in FIG. 1.

FIG. 13 shows the tank 51 as the heating medium passage forming member incorporating the perforated plate 52 as in the heating medium mixer 50 shown in FIGS. 11 and 12. The tank 51 is provided with an inclined piping 55 intervening between the inlet hole 33 and the heating medium supply piping 6, the inclined piping 55 being upwardly inclined continuously with the laterally extending heating medium supply piping 6. There is no limitation on the angle of inclination alpha ($\alpha$) relative to the horizontal. This arrangement allows the heating medium to flow into the tank 51 in a direction offset from the location of the outlet hole 34. If the inclined piping 55 is removable from both of the heating medium supply piping 6 and the tank 51, replacement with another inclined piping having a different angle of inclination is possible. Even when the perforated plate is not provided with the perforation-free region 53 (i.e., uniformly formed with perforations 52a over the entire surface), the use of the inclined piping 55 is preferable because the inclined piping 55 causes the heating medium to flow into the tank 51 in a direction away from the location of the outlet hole 34.

The provision of the inclined piping 55 is not limited to the heating medium mixer incorporating the perforated plate 52. For example, the piping 35 forming the inlet member shown in any one of FIGS. 5, 6, 7, 8 and 9 may be joined with the inclined piping 55 to make the outlet hole 34 offset from the extension of the central axis of the inlet hole 33 of each heating medium passage. In this case, the direction in which the inclined piping 55 is attached and the angle of inclination relative to the central axis of the inlet hole are appropriately selected to meet the heating medium passage associated with the inclined piping 55.

Figure 14:
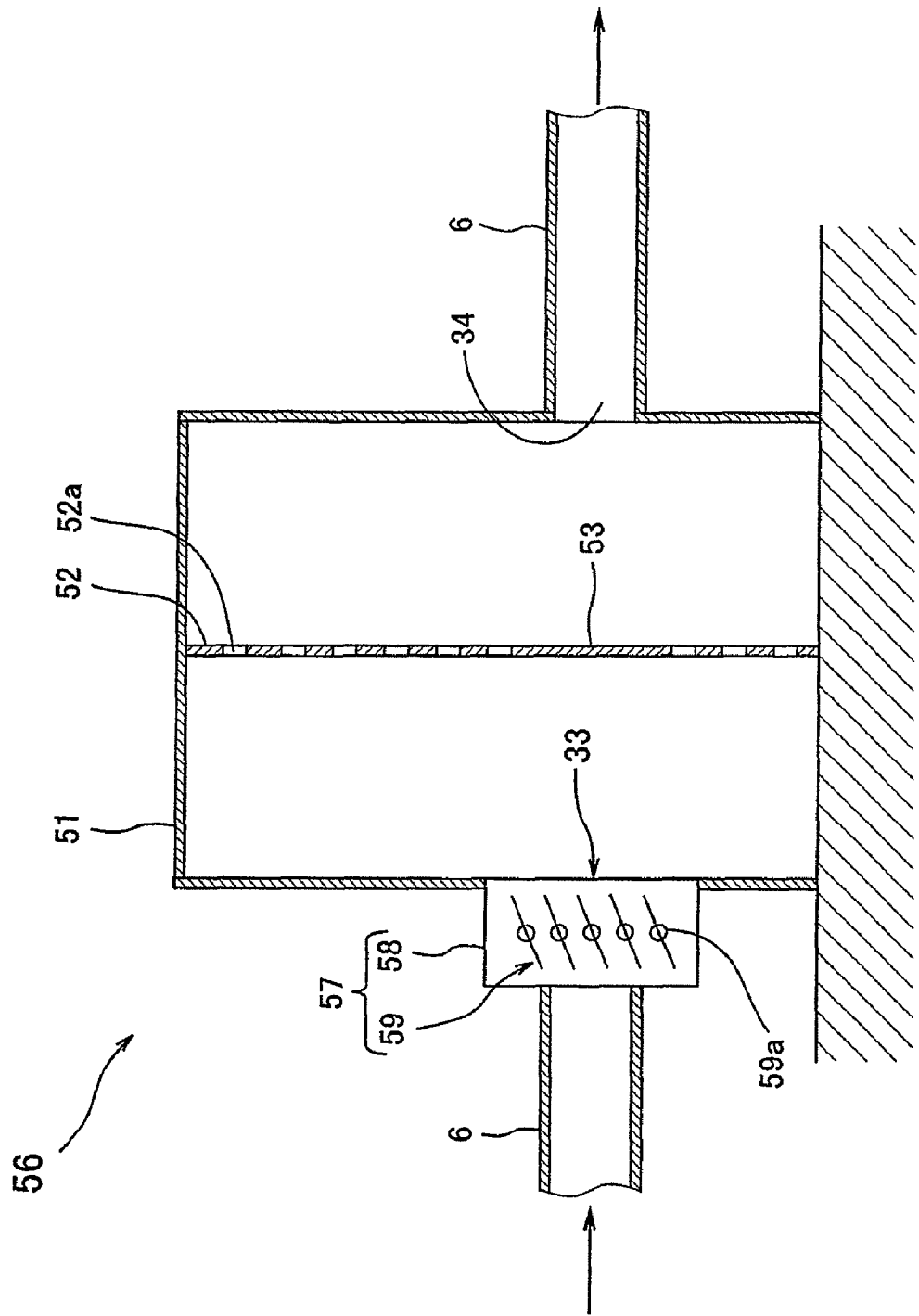
FIG. 14 is a vertical sectional view showing yet another example of a heating medium mixer which can be provided in the integrated solar combined cycle electric power generation system shown in FIG. 1.

FIG. 14 shows another heating medium mixer 56. This heating medium mixer 56 includes the tank 51 as the heating medium passage forming member incorporating the perforated plate 52, like the heating medium mixer 50 shown in FIGS. 11 and 12. The tank 51 is provided with a heating medium introducing device 57 intervening between the inlet hole 33 of the tank 51 and the heating medium supply piping 6 for changing the inflow direction of the heating medium. While the heating medium mixer 50 essentially performs the function of time-lag mixing the heating medium having flown thereinto, the provision of the heating medium introducing device 57 makes it possible to change the stream of the heating medium, thereby further enhancing the uniform time-lag mixing effect.

Figure 15:
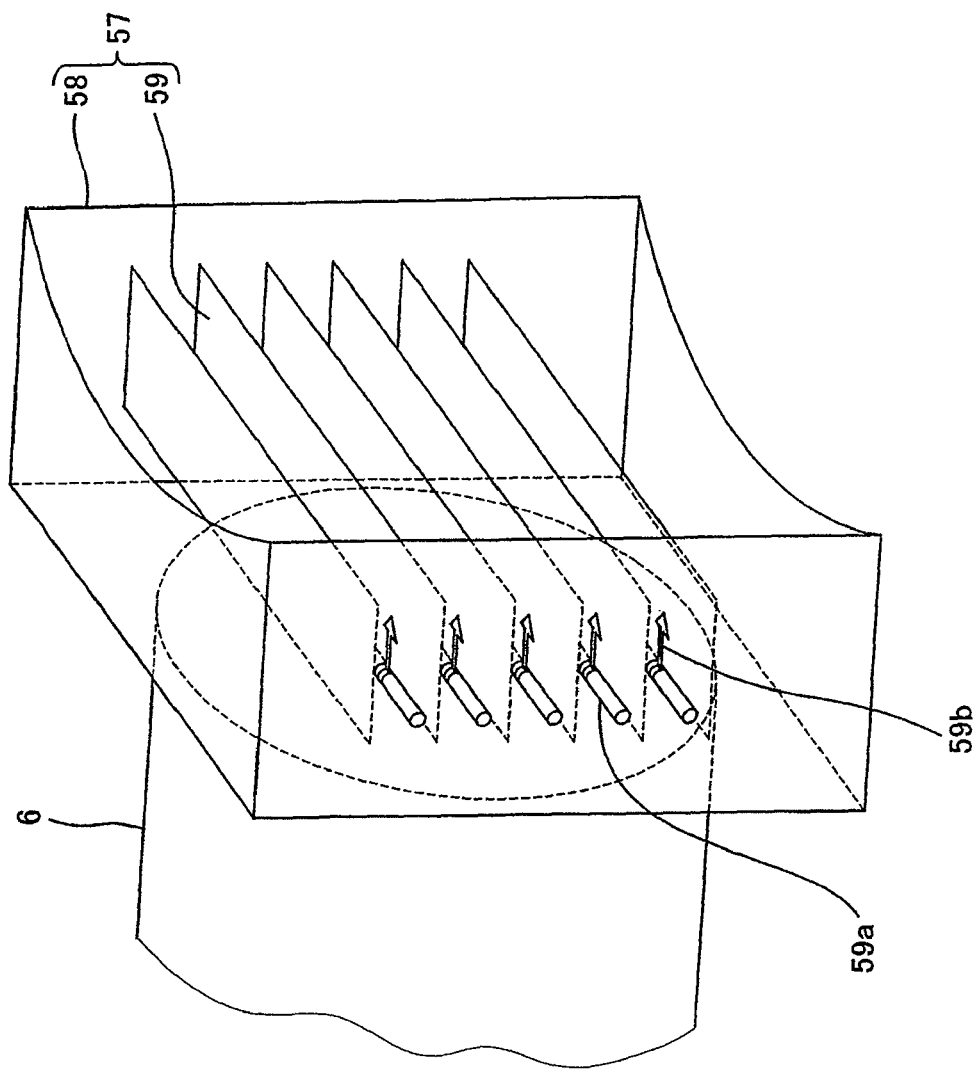
FIG. 15 is a partially cutaway perspective view showing an example of a heating medium introducing device used in the heating medium mixer shown in FIG. 14.

As apparent from FIG. 14 together with FIG. 15, the heating medium introducing device 57 includes a housing 58 intervening between the inlet hole 33 of the tank 51 and the heating medium supply piping 6, and plural adjustable louvers 59 spaced vertically from each other within the housing 58. Each of the adjustable louvers 59 is positioned substantially laterally and its rotating shaft protrudes exteriorly of the housing 58. The louver 59 can be pivotally moved vertically by turning the protruding portion of the rotating shaft 59a by known means such as electric motor, hydraulic motor, pneumatic cylinder, or hydraulic cylinder. With the louvers 59 pivoting vertically, the inflow direction of the heating medium can be adjusted correspondingly. There is no limitation on the number of such louvers. One or plural louvers can be used to serve the purpose.

The rotating shafts 59a protruding exteriorly of the housing 58 are each provided with an inclined direction indicator 59b for indicating the inclined direction of each louver 59, namely, the inflow direction of the heating medium from the outside of the heating medium introducing device 57. An alternative arrangement is applicable wherein a non-illustrated detector detects the inclined direction of each louver and then transmits a detection signal to the control device 70 (see FIGS. 1 to 4), which in turn causes a non-illustrated remote indicator to indicate the inclined direction based on the detection signal. It is possible to provide the housing 58 with a see-through window for the operator to check the inclined direction of each louver from outside.

As described earlier, by providing at both of the upstream side portion and the downstream side portion of the heating medium supply piping 6 relative to the heating medium mixer with the respective temperature measuring devices, it is possible to monitor the temperature fluctuation suppressing effect of the heating medium mixer based on a comparison result between measured values. In this case, such an arrangement is simply employed as to cause the temperature measuring devices 81 to transmit their measured values of temperature to the control device 70. This arrangement allows the control device 70 to calculate the deviation between an established value of a temperature fluctuation suppressing level and a detected value and control the heating medium inflow angle (i.e., the angle of inclination of each louver 59) of the heating medium introducing device 57 so as to lessen the deviation (i.e., to maximize the time-lag mixing effect). Further, if data obtained by the temperature measuring devices continuously measuring the temperature of the heating medium is accumulated by the control device 70 which controls the angle of inclination of the louvers 59, an optimum angle of inclination of the louver 59 for time-lag mixing can be determined. The heating medium introducing device 57 is applicable to any of the heating medium mixers described above and to be described later.

While the heating medium introducing device 57 shown in FIG. 14 has the adjustable louvers 59 assembled within the housing 58 installed exteriorly of the tank, the present invention is not limited to this structure. For example, it is possible that the adjustable louver 59 having no housing is positioned at a location adjacent to the inlet within the tank so as to be driven for pivotal movement from the outside of the tank.

Figure 16:
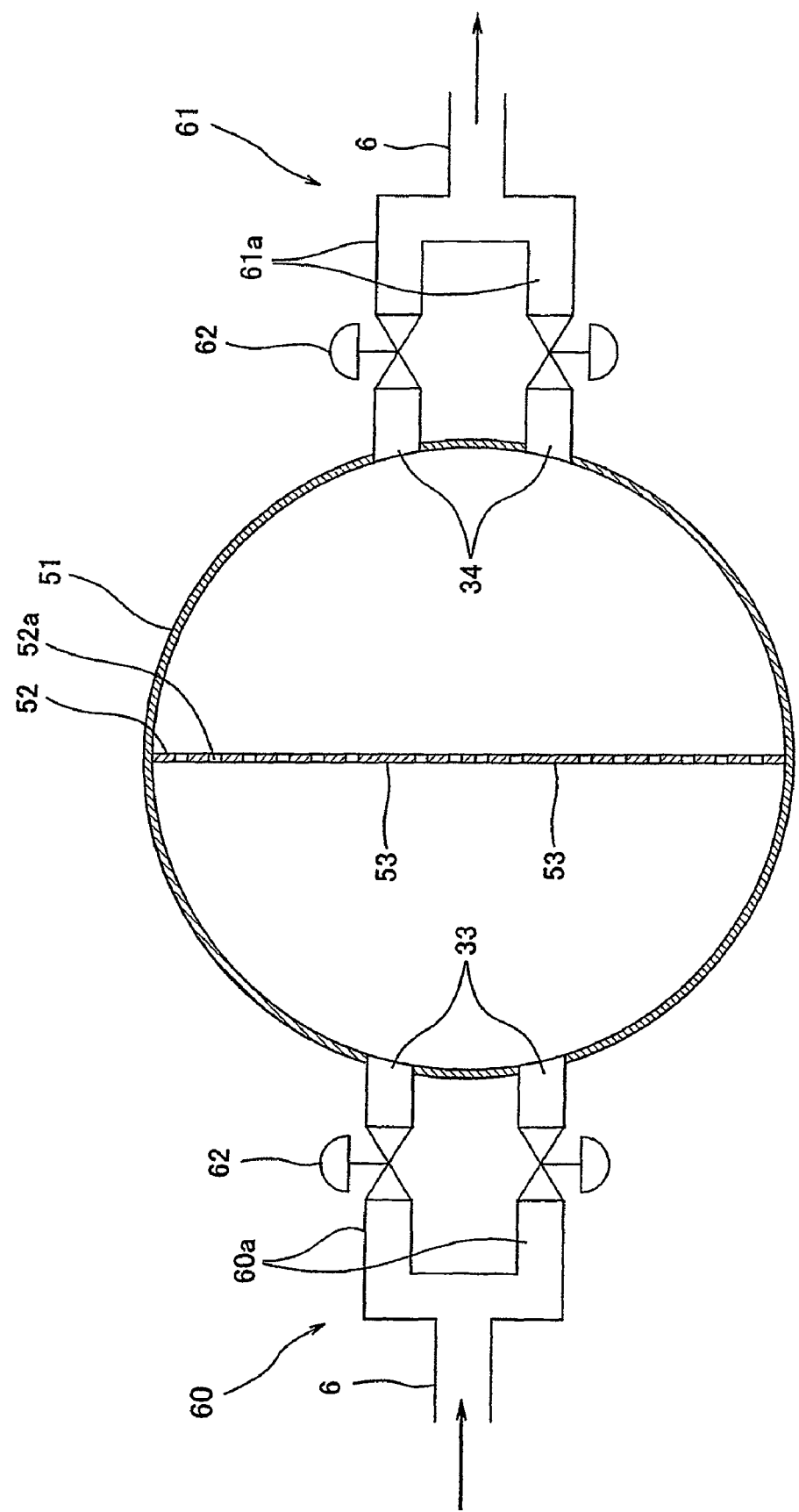
FIG. 16 is a cross-sectional view showing yet another example of a heating medium mixer which can be provided in the integrated solar combined cycle electric power generation system shown in FIG. 1.

FIG. 16 shows the tank 51 having its peripheral wall (or its bottom) formed with two (or three or more) inlet holes 33 and two (or three or more) outlet holes 34. The inlet member connecting the heating medium supply piping 6 to the inlet holes 33 comprises piping 60 having branch pipings 60a branched off from the heating medium supply piping 6 toward the respective inlet holes 33, and flow control valves (or stop valves) 62 provided to each of the branch pipings 60a. On the other side, the outlet member connecting the outlet holes 34 to the heating medium supply piping 6 comprises piping 61 having branch pipings 61a which extend from the respective outlet holes 34 and are unified to connect to the heating medium supply piping 6, and flow control valves (or stop valves) 62 provided to the respective branch pipings 61a. It is possible to provide only one outlet hole 34 and plural inlet holes 33.

The above-described control device 70 is capable of opening and closing an appropriately selected one of the flow control valves 62 on the inlet side or adjusting the flow rate of the heating medium by the selected flow control valve 62 to change the heating medium inflow position or adjust the heating medium flow rate at the heating medium inflow position. In this way, the control device 70 controls the flow control valves 62 so as to optimize the stream of the heating medium within the tank 51. For optimization of the stream of the heating medium, a data set that is most suited to the condition of a similar operation (including heating medium temperature, flow rate, residence time in the tank, and other factors) can be applied based on reference to data sets created from a large amount of operation data. For example, the control device 70 calculates the deviation between an established temperature fluctuation suppressing level and a detected fluctuation suppressing level determined from the temperature values detected by the two temperature measuring devices and then controls the heating medium flow rate and the heating medium inflow position so as to suppress the deviation (i.e., to maximize the time-lag mixing effect). Such flow control is applicable to any heating medium mixer which is capable of controlling the flow rate of the heating medium flowing thereinto like the heating medium mixers shown in FIGS. 5 and 7 to 9.

If the control device 70 is configured to operate the flow control valve 62 on the outlet side shown in FIG. 16 in synchronism with the operation of the selected flow control valve 62 on the inlet side, it is possible to realize a more preferable stream condition of a heating medium for time-lag mixing of the heating medium than that obtained by the controlling of only the flow control valve 62 on the inlet side. The branched piping 60 on the inlet side may be combined with the aforementioned inclined piping 55 or heating medium introducing device 57.

A combination of the inclined piping 55 and the heating medium mixer and a combination of the heating medium introducing device 57 and the heating medium mixer are also included in the scope of the "heating medium temperature fluctuation suppressing device" as used herein. Each of the foregoing various heating medium mixers may be provided with a booster or a suction device for compensating a pressure loss of the heating medium.

FIGS. 17 to 22 illustrate various embodiments of piping each connecting a respective one of the foregoing heating medium mixers (hereinafter will be generally represented by the heating medium mixer 50 shown in FIG. 11) to the heating medium supply piping 6 in the heating medium supply system 11. Such piping is not limited to the embodiments shown in these figures.

Figure 17:
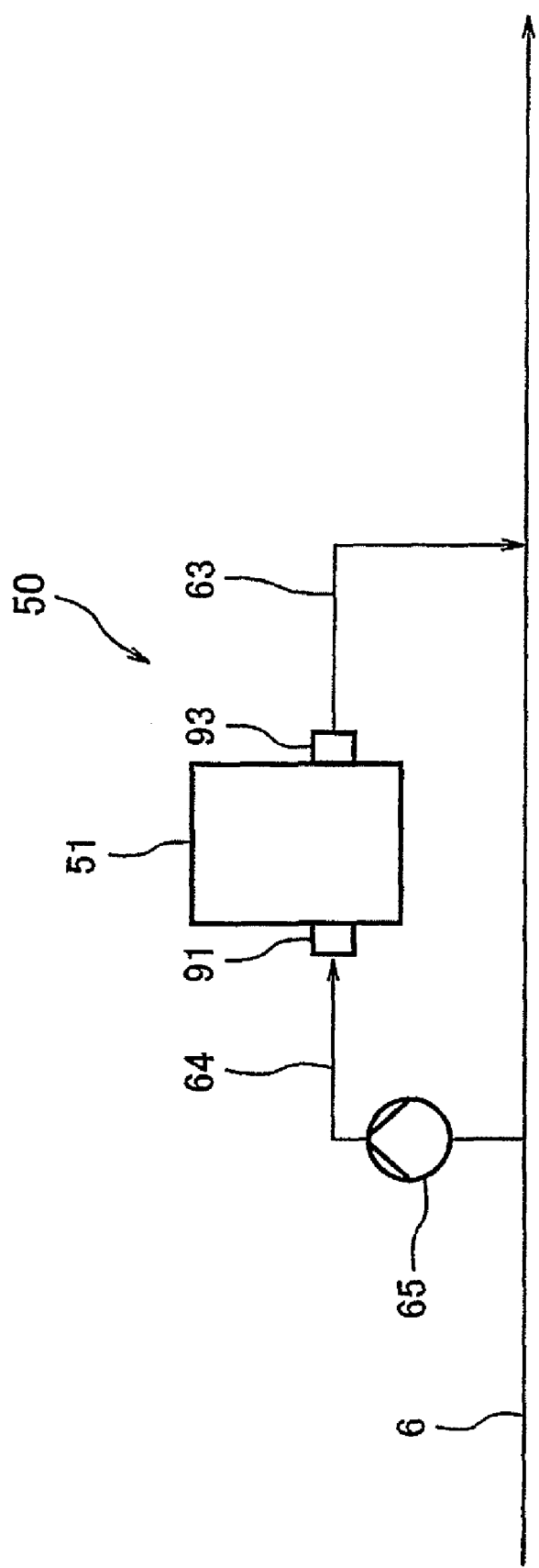
FIG. 17 is a piping diagram illustrating one embodiment of a temperature fluctuation suppressing device which can be provided in the integrated solar combined cycle electric power generation system shown in FIG. 1.

FIG. 17 shows the heating medium mixer 50 positioned, so to speak, in parallel connection with the heating medium supply piping 6. Stated otherwise, the heating medium mixer 50 shown is provided to a bypass piping associated with the heating medium supply piping 6. Specifically, there are provided the upstream side inlet piping 64 providing communication between the inlet member 91 of the tank 51 and the heating medium supply piping 6, and the outlet piping 63 providing communication between the outlet member 93 and the heating medium supply piping 6. The upstream side inlet piping 64 is joined to the heating medium supply piping 6 at a location upstream of the joint between the outlet piping 63 and the heating medium supply piping 6. The upstream side inlet piping 64 and the outlet piping 63 form the aforementioned bypass piping.

The upstream side inlet piping 64 is provided with a pump 65 as a heating medium feeding device for feeding the heating medium into the tank 51. Accordingly, a portion of the heating medium flows into the tank 51 through the upstream side inlet piping 64 and is then subjected to time-lag mixing within the tank 51. Thereafter, the same amount of the heating medium returns to the heating medium supply piping 6 from the tank 51 through the outlet piping 63. The portion of the heating medium thus returned to the heating medium piping 6 is time-lag mixed with the heating medium flowing in the heating medium supply piping 6. Since the upstream side inlet piping 64 is joined to the heating medium supply piping 6 at a location upstream of the joint between the outlet piping 63 and the heating medium supply piping 6, the aforementioned pump 65 may not be applied in such pipings that the pressure loss is considered at a planning stage. This holds true for the upstream side inlet piping 64 shown in FIG. 19 to be described later.

Figure 18:
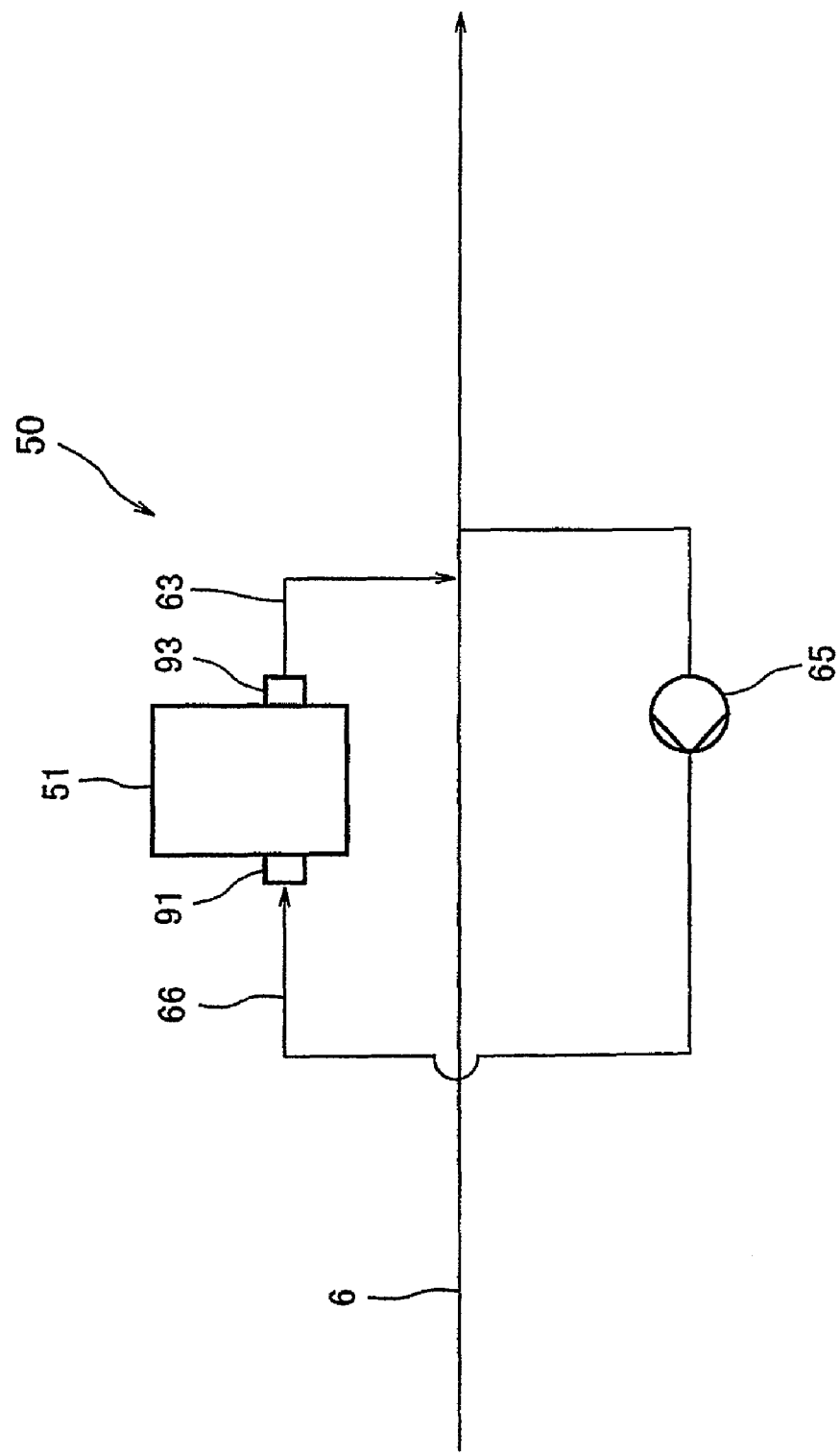
FIG. 18 is a piping diagram illustrating another embodiment of a temperature fluctuation suppressing device which can be provided in the integrated solar combined cycle electric power generation system shown in FIG. 1.

FIG. 18 also shows the heating medium mixer 50 positioned in parallel connection with the heating medium supply piping 6. As shown, an inlet piping 66 is connected between the inlet member 91 of the tank and the heating medium supply piping 6 and the outlet piping 63 connected between the outlet member 93 and the heating medium supply piping 6. However, the inlet piping 66 is joined to the heating medium supply piping 6 at a location downstream of the joint between the outlet piping 63 and the heating medium supply piping 6. For this reason, the inlet piping 66 will be referred to as downstream side inlet piping 66. The downstream side inlet piping 66 is provided with the pump 65 for supplying the heating medium into the tank 51.

With such an arrangement in which the downstream side inlet piping 66 is joined to the heating medium supply piping 6 at a location downstream of the joint between the outlet piping 63 and the heating medium supply piping 6, the heating medium is supplied into the tank 51 through the downstream side inlet piping 66 by means of the pump 65, subjected to time-lag mixing and then flows out to the outlet piping 63 from the outlet member 93. The heating medium once time-lag mixed and returned to the heating medium supply piping 6 through the outlet piping 63 is again time-lag mixed with the heating medium continuously flowing in the heating medium supply piping 6. That is, a portion of the heating medium of which temperature fluctuation has been once suppressed is allowed to circulate and repeat time-lag mixing, which results in effective time-lag mixing. Time-lag mixing within the tank 51 is performed over a longer span of lag time when the length of the downstream side inlet piping 66 is provided longer.

Figure 19:
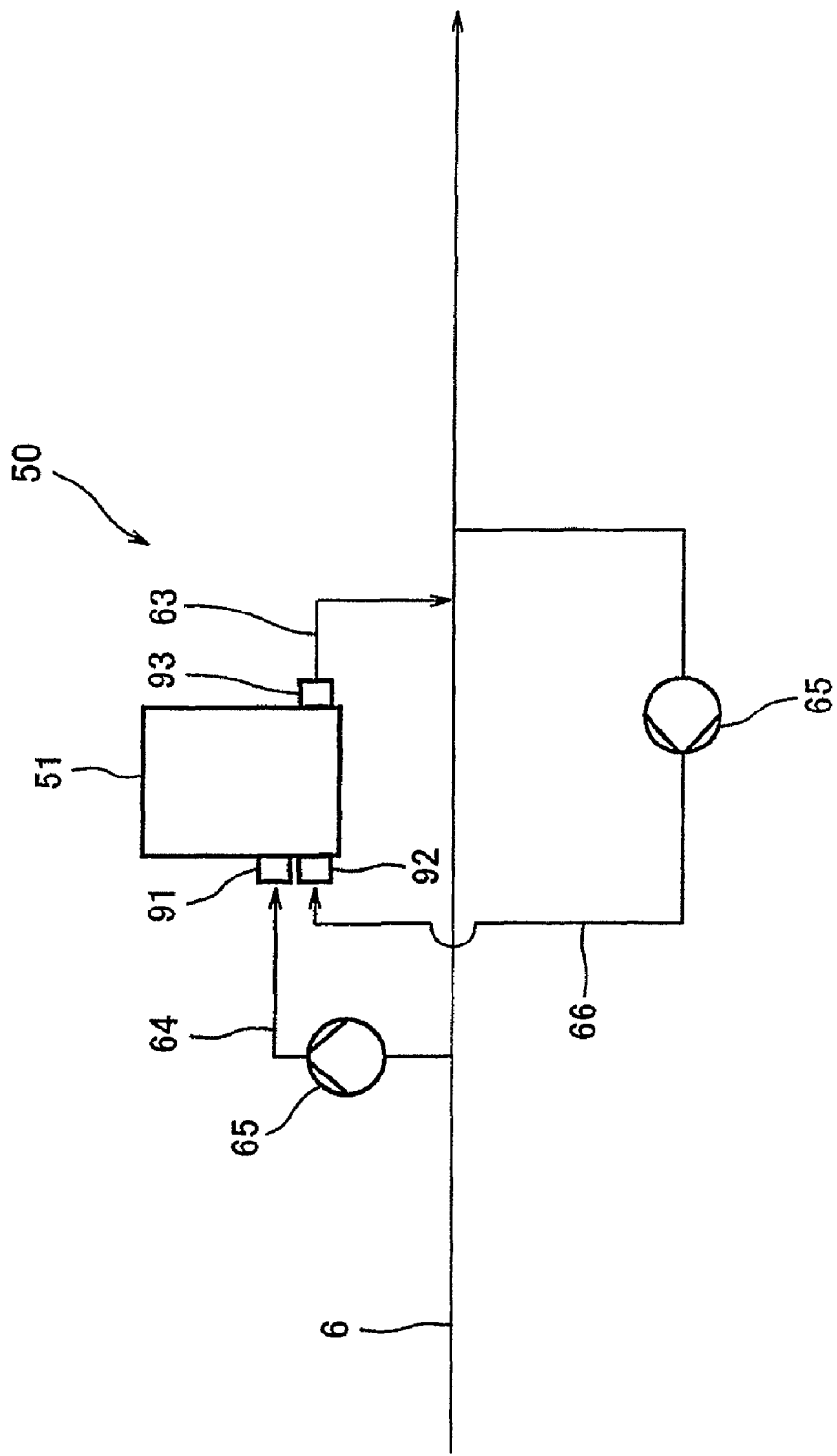
FIG. 19 is a piping diagram illustrating yet another embodiment of a temperature fluctuation suppressing device which can be provided in the integrated solar combined cycle electric power generation system shown in FIG. 1.

FIG. 19 also shows the heating medium mixer 50 positioned in parallel connection with the heating medium supply piping 6. As shown, the outlet piping 63 and the upstream side inlet piping 64 provided with the pump 65 are connected between the tank 51 and the heating medium supply piping 6. That is, the upstream side inlet piping 64 is connected to the inlet member 91 of the tank 51 and the outlet piping 63 is connected to the outlet member 93. Furthermore, the tank 51 is provided with an additional inlet member 92 which is connected to the downstream side inlet piping 66. The downstream side inlet piping 66 is joined to the heating medium supply piping 6 at a location downstream of the joint between the outlet piping 63 and the heating medium supply piping 6. The downstream side inlet piping 66 is provided with the pump 65 for supplying the heating medium into the tank 51.

As shown, the joints (inlet members 91 and 92) between the upstream side inlet piping 64 and the tank 51, and between the downstream side inlet piping 66 and the tank 51, are located close to each other.

With this arrangement, a portion of the heating medium is fed with a pressure to the tank 51 from the upstream side of the heating medium supply piping 6 through the upstream side inlet piping 64, while at the same time another portion of the heating medium fed with a pressure to the tank 51 from the downstream side of the heating medium supply piping 6 through the downstream side inlet piping 66. These portions are time-lag mixed in the tank 51 and then flow out to the outlet piping 63 from the outlet member 93. That is, a portion of the heating medium of which temperature fluctuation has been once suppressed is allowed to circulate through, which results in repetition of time-lag mixing within the tank 51 over a prolonged time. In the case that the length of the downstream side inlet piping 66 is provided longer, the heating medium is repeatedly time-lag mixed and its lag time becomes preferably longer, thus resulting in more effective time-lag mixing.

Figure 20:
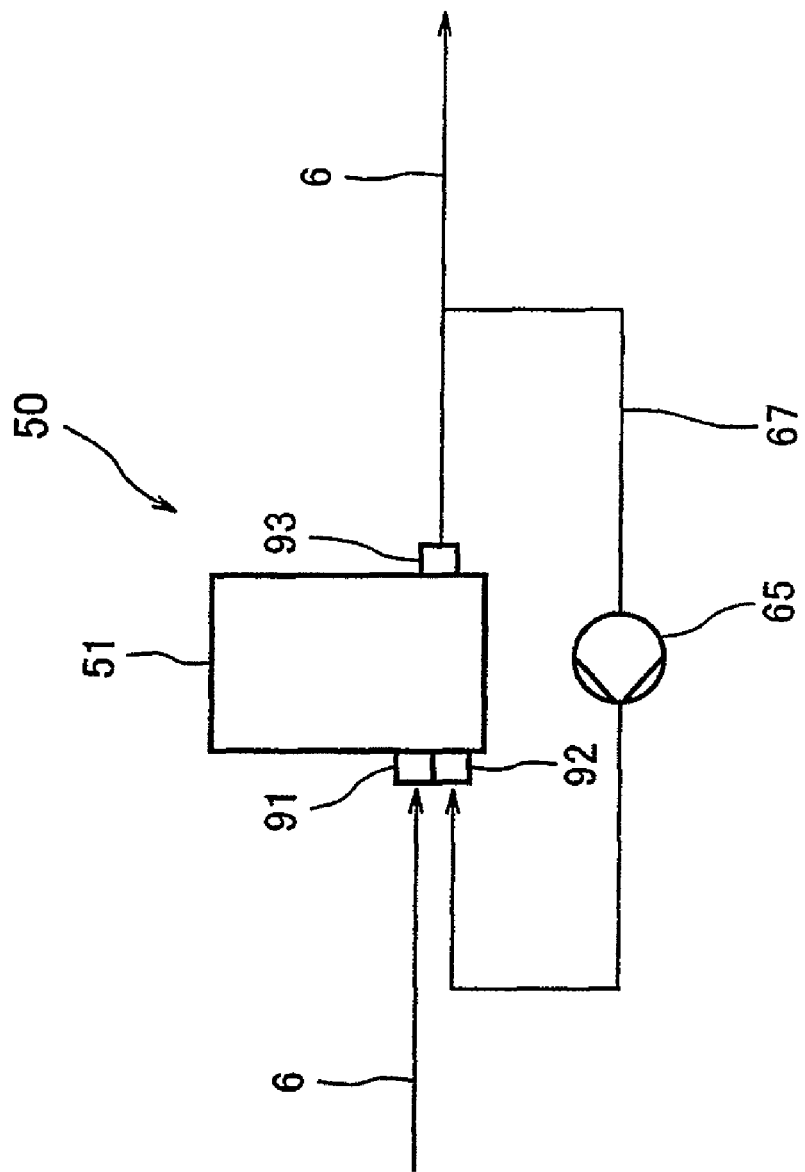
FIG. 20 is a piping diagram illustrating yet another embodiment of a temperature fluctuation suppressing device which can be provided in the integrated solar combined cycle electric power generation system shown in FIG. 1.

FIG. 20 shows the heating medium mixer 50 having the tank 51 provided with one outlet member 93 and two inlet members 91 and 92. One inlet member 91 is connected to the upstream side portion of the heating medium supply piping 6, while the outlet member 93 is connected to the downstream side portion of the heating medium supply piping 6. The other inlet member 92 is connected to return piping 67 connected to the downstream side portion of the heating medium supply piping 6. The two inlet members 91 and 92 are located close to each other. The return piping 67 is provided with the pump 65 for feeding the heating medium into the tank 51.

With such an arrangement, the heating medium of which temperature fluctuation has been once suppressed in the tank 51 is partially returned to the tank 51 for time-lag mixing again, which results in more effective time-lag mixing. In the case of the length of the return piping 67 being provided longer, the heating medium is repeatedly time-lag mixed over a longer span of lag time.

Figure 21:
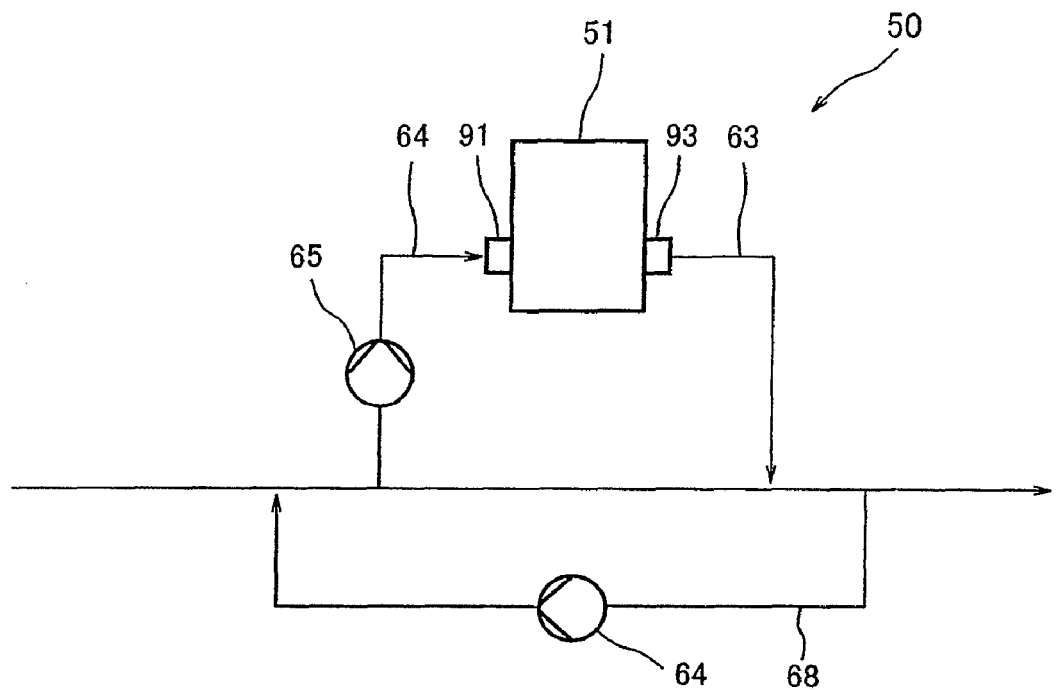
FIG. 21 is a piping diagram illustrating yet another embodiment of a temperature fluctuation suppressing device which can be provided in the integrated solar combined cycle electric power generation system shown in FIG. 1.

FIG. 21 shows the heating medium mixer 50 provided to bypass piping comprising the upstream side inlet piping 64 and the outlet piping 63, both of which are connected to the heating medium supply piping 6. The upstream side inlet piping 64 is provided with the pump 65 for supplying the heating medium into the tank 51. The heating medium supply piping 6 is further provided with a return piping 68 bypassing the heating medium mixer 50 for returning the heating medium from the downstream side to the upstream side of the mixer 50. The return piping 68 is provided with the pump 65 for feeding the heating medium with a pressure upstream.

With this arrangement, the heating medium is partially fed with a pressure from the downstream side to the upstream side of the heating medium supply piping 6 relative to the heating medium mixer 50 through the return piping 68 and then subjected to time-lag mixing again before flowing into the tank 51. The heating medium is further time-lag mixed within the heating medium mixer 50. That is, the heating medium of which temperature fluctuation has been once suppressed is partially allowed to circulate through, which results in repeating time-lag mixing within the tank 51 over a longer span of lag time. In the case of the return piping 68 being made longer, the heating medium is repeatedly time-lag mixed over a longer span of lag time, thus resulting in more effective time-lag mixing.

Figure 22:
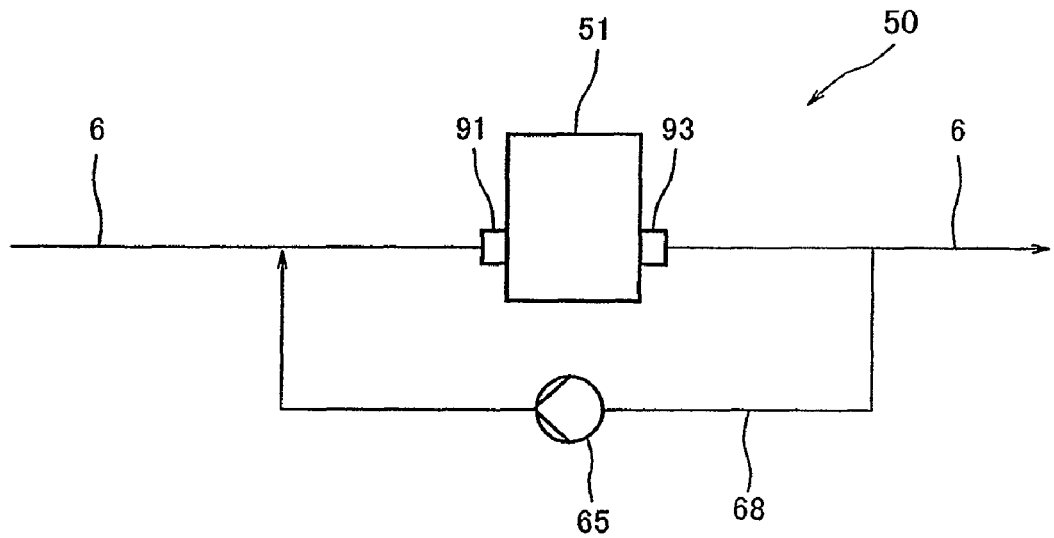
FIG. 22 is a piping diagram illustrating yet another embodiment of a temperature fluctuation suppressing device which can be provided in the integrated solar combined cycle electric power generation system shown in FIG. 1.

FIG. 22 shows the heating medium mixer 50 having the tank 51 provided with the inlet member 91 connected to the upstream side portion of the heating medium supply piping 6 and the outlet member 93 connected to the downstream side portion of the heating medium supply piping 6. The heating medium supply piping 6 is further provided with the return piping 68 bypassing the heating medium mixer 50 for returning the heating medium from the downstream side to the upstream side of the heating medium supply piping 6 relative to the mixer 50. The return piping 68 is provided with the pump 65 for feeding the heating medium with a pressure upstream.

This arrangement also allows a portion of the heating medium of which temperature fluctuation has been once suppressed to circulate through, which results in repeating time-lag mixing within the tank 51 over a longer span of lag time. With the length of the return piping 68 being provided longer, the heating medium being repeatedly time-lag mixed can reside for a longer span of residence time, thus resulting in more effective time-lag mixing.

Figure 23:
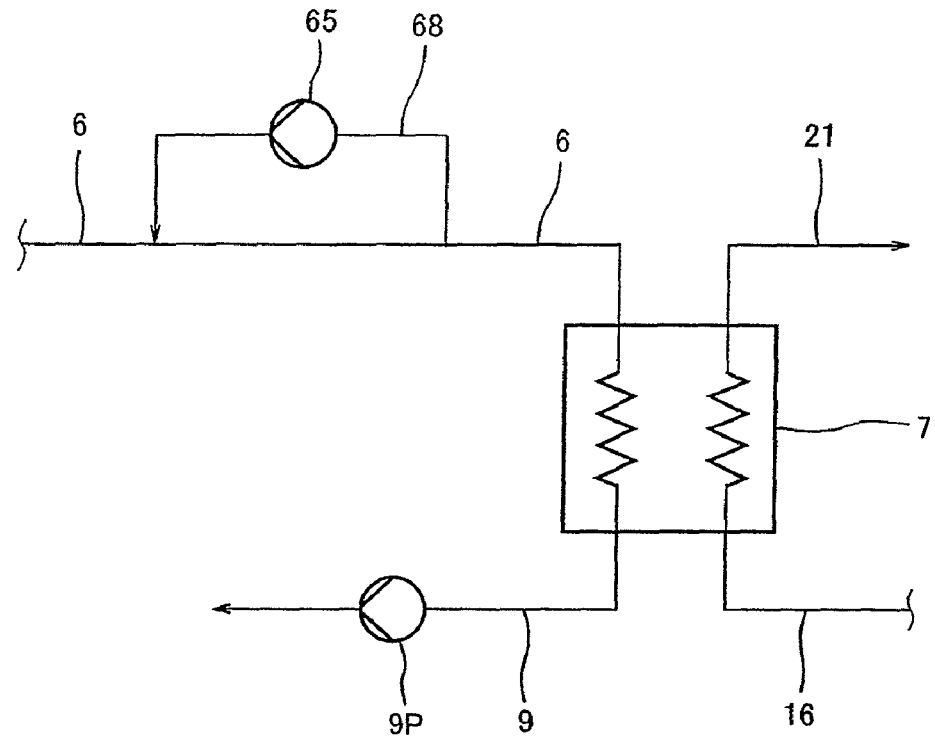
FIG. 23 is a piping diagram illustrating yet another embodiment of a temperature fluctuation suppressing device which can be provided in the integrated solar combined cycle electric power generation system shown in FIG. 1.

FIG. 23 shows a temperature fluctuation suppressing device for the heating medium which does not include the heating medium mixer and has a piping contrived so as to realize time-lag mixing of the heating medium. That is, this temperature fluctuation suppressing device has the same concept as the temperature fluctuation suppressing device shown in FIG. 22 from which the heating medium mixer 50 is eliminated. Specifically, the heating medium supply piping 6 is provided with the return piping 68 for returning the heating medium from the downstream side (the heat exchanging device side) to the upstream side (the heat collector unit side) of the heating medium supply piping 6. The return piping 68 is provided with the pump 65. This arrangement also allows a portion of the heating medium to circulate in the piping 6, which results in time-lag mixing of the heating medium.

The return piping 68 may also be provided so as to feed the heating medium with a pressure in the direction from the upstream side toward the downstream side. That is, the aforementioned return piping 68 functions so as not to return the fluid backward but to feed a part of the heating medium with a pressure toward the heat exchanging device 7 rapidly. This arrangement realizes time-lag mixing of the heating medium at the joint between this partially rapid feeding piping and the heating medium supply piping 6 which is located on the downstream side.

Figure 24:
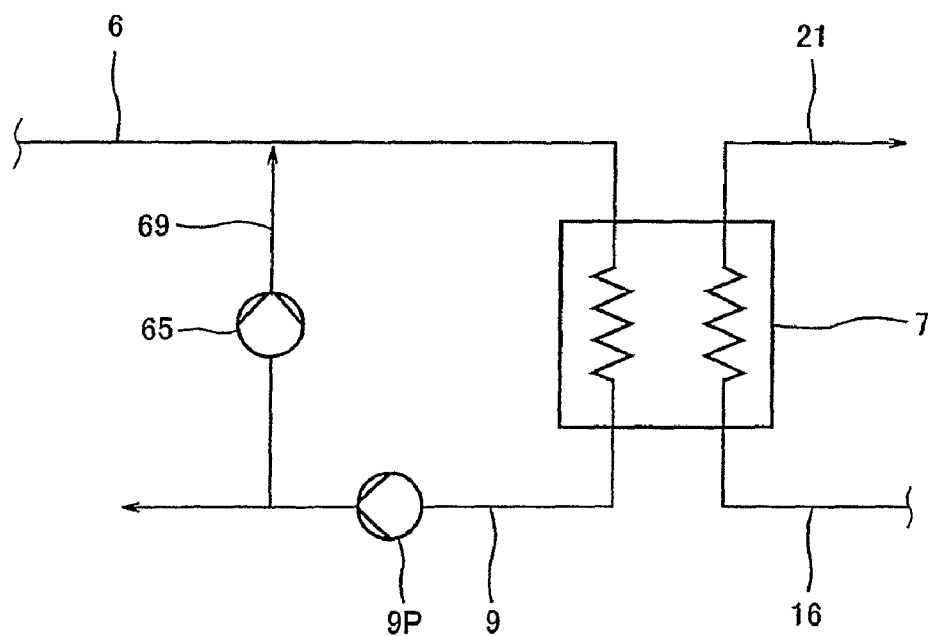
FIG. 24 is a piping diagram illustrating yet another embodiment of a temperature fluctuation suppressing device which can be provided in the integrated solar combined cycle electric power generation system shown in FIG. 1.
Figure 25:
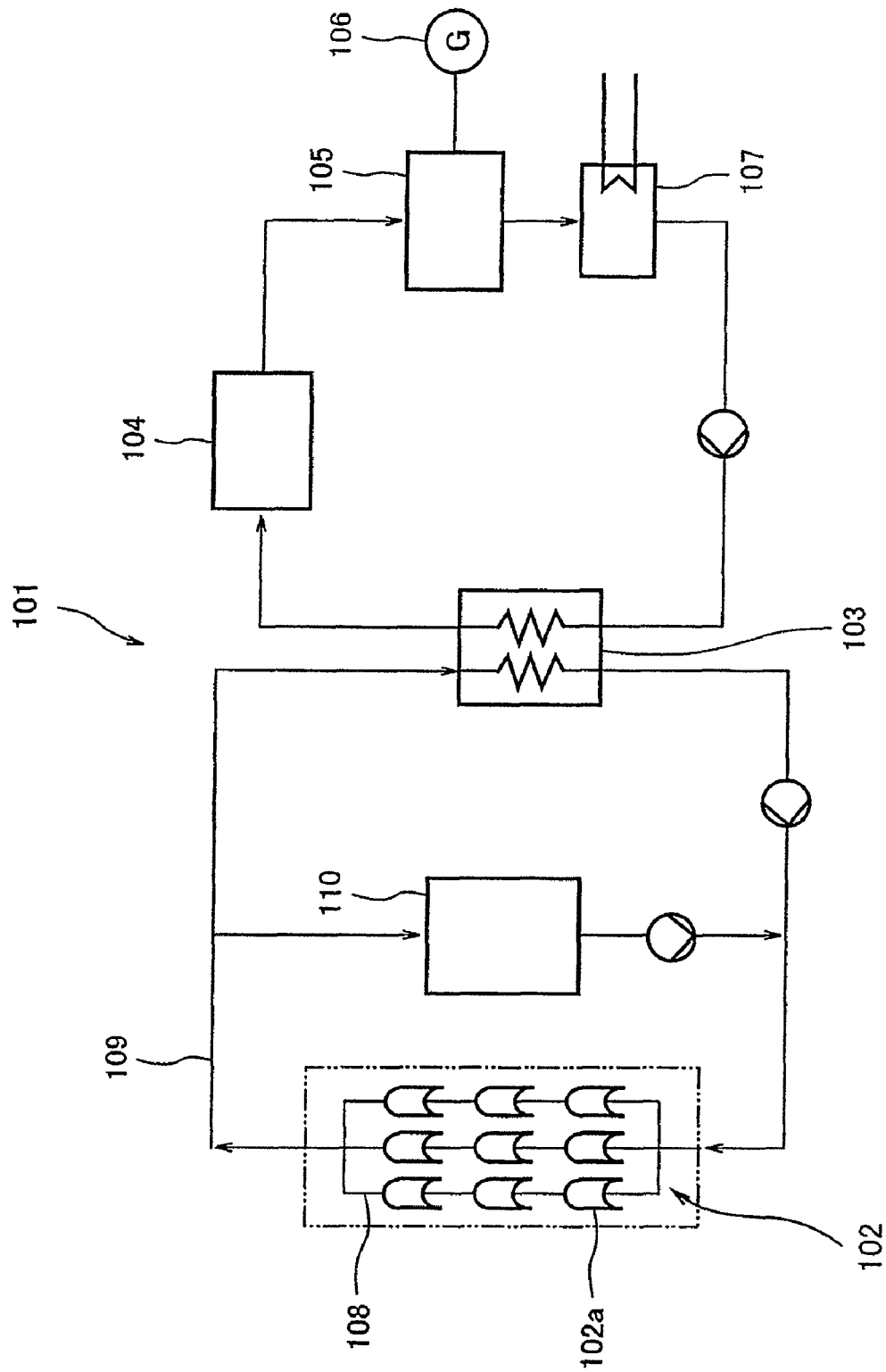
FIG. 25 is a piping diagram schematically illustrating one example of a conventional solar thermal electric power generation system.
Figure 26:
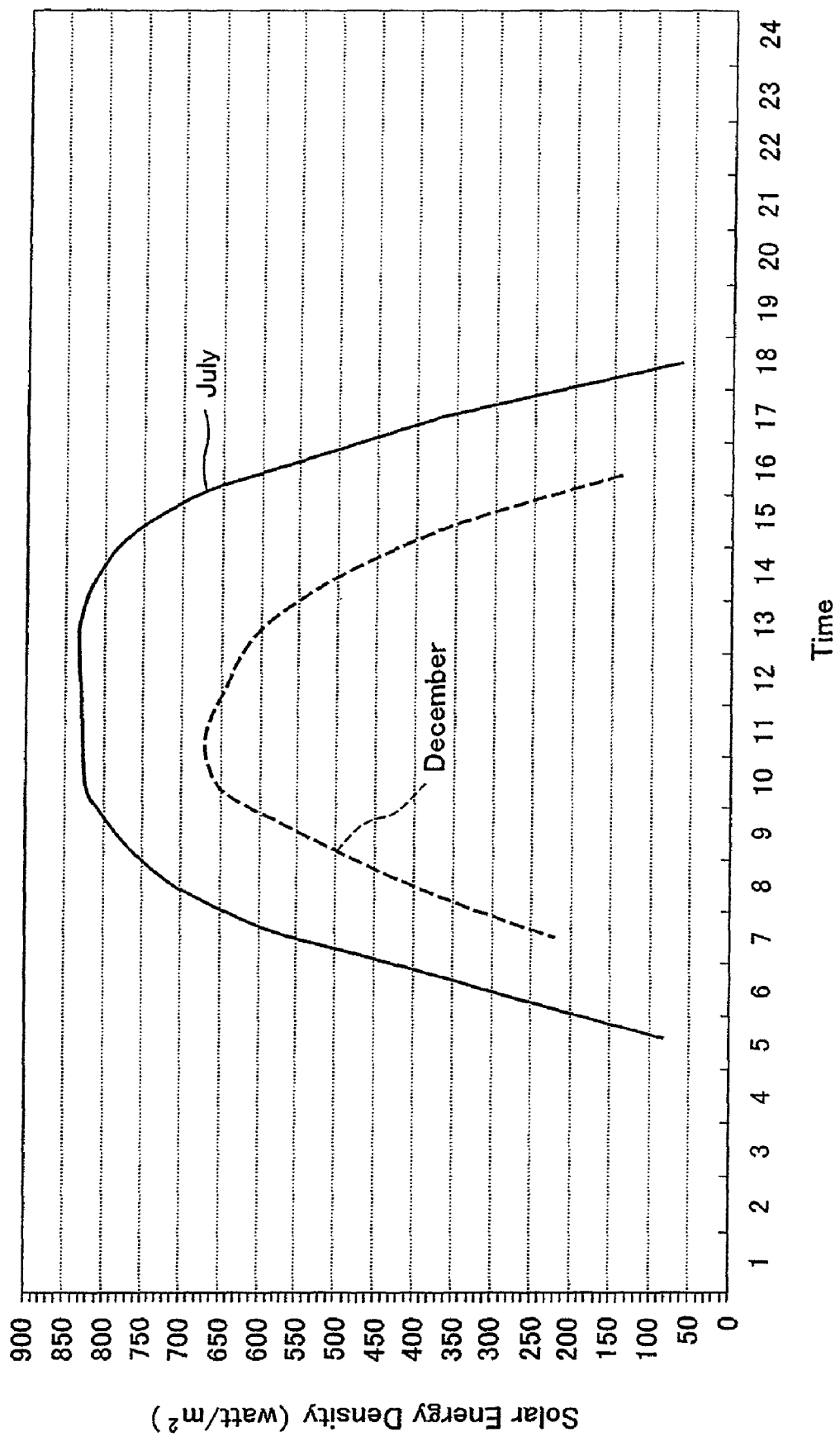
FIG. 26 is a graph plotting variations in solar energy density with time in one day.

FIG. 24 shows a temperature fluctuation suppressing device for the heating medium which also does not include the heating medium mixer and has a piping contrived so as to perform time-lag mixing of the heating medium. The heating medium supply piping 6 is provided with a return piping 69 bypassing the heat exchanging device 7 for returning the heating medium from the downstream side (return piping 9) to the upstream side of the heating medium supply piping 6. The return piping 68 is provided with the pump 65 for feeding the heating medium with a pressure upstream.

With this arrangement, the heating medium is partially fed with a pressure from the downstream side to the upstream side of the heating medium supply piping 6 relative to the heat exchanging device 7 through the return piping 69, subjected to time-lag mixing and then supplied to the heat exchanging device 7 again. Thus, the heat exchanging device 7 is supplied with time-lag mixed heating medium except at the starting time of the heating medium supply system.

Any one of the temperature fluctuation suppressing devices for the heating medium (shown in FIGS. 5 to 24) thus described above may be provided on its inlet side and/or outlet side a reservoir for allowing the heating medium supplied from the heating medium supply piping 6 to reside therein temporarily. When the heating medium is allowed to reside in the reservoir having a relatively large volume, time-lag mixing of the heating medium can take place also. The reservoir is preferably provided with a large heat accumulating capacity by a known technique so that temperature fluctuation of the heating medium can be further suppressed. Further, the inlet side reservoir and the outlet side reservoir are each preferably provided with a feeding device, such as a pump, for feeding the heating medium from the inlet side reservoir to the temperature fluctuation suppressing device and from the outlet side reservoir to the heat exchanging device.

It is possible to use any one of the foregoing temperature fluctuation suppressing devices (shown in FIGS. 5 to 24) singly or arrange a plurality of such temperature fluctuation suppressing devices in series or in parallel.

While the foregoing embodiments are each adapted to an integrated solar combined cycle electric power generation system using a gas turbine and a steam turbine, the present invention is not particularly limited to the integrated solar combined cycle electric power generation system. The heating medium mixers and heating medium supply system described above are applicable to an electric power generation system applying a steam turbine which does not apply a gas turbine. Besides these types of electric power generation systems, the heating medium mixers and the heating medium supply system are applicable to any system which is inevitably accompanied with temperature fluctuations of the heating medium.

It should be noted that the foregoing embodiments are only illustrative and may be modified variously without departing from the concept of the present invention. Therefore, the present invention is not limited to the foregoing embodiments.

INDUSTRIAL APPLICABILITY

According to the present invention, a liquid heating medium accompanied with temperature fluctuation, which is supplied to a heat exchanging device in such a system as a solar thermal electric power generation system, is subjected to time-lag mixing relying upon a simple arrangement, whereby temperature fluctuations of the liquid heating medium can be suppressed or lessened. Therefore, the present invention is useful for a system using a heating medium of which temperature fluctuates unavoidably, such as an electric power generation system.

The invention claimed is:
1. A temperature fluctuation suppressing device for a heating medium provided on a heating medium supply passage for supplying a liquid heating medium to a heat exchanging device, which comprises a heating medium mixer for mixing the heating medium,
said heating medium mixer comprising:
a heating medium passage forming member having plural heating medium passages;
an inlet member allowing the heating medium to flow into said heating medium passage forming member from said heating medium supply passage; and
an outlet member allowing the heating medium to flow out of said heating medium passage forming member to said heating medium supply passage, said outlet member being provided separately from said inlet member,
whereby the heating medium continuously flowing into said heating medium passage forming member through said inlet member passes through said plural heating medium passages with time-lags to form respective streams, which are then joined together before flowing out through said outlet member, wherein:

said heating medium passage forming member comprises a first container defining therein plural cells each forming a respective one of said heating medium passages;

each of said cells has an inlet and an outlet for the heating medium;

said inlet member comprises branch portions branched off from said heating medium supply passage which are each connected to a respective one of said inlets of said cells;

said outlet member unifies said outlets of said cells and is connected to said heating medium supply passage; and said branch portions of said inlet member are each provided with a flow control device which is capable of adjusting a flow rate of the heating medium.

2. The temperature fluctuation suppressing device for the heating medium according to claim 1, wherein said outlet for the heating medium is formed at a location offset from an extension of a central axis of said inlet.

3. The temperature fluctuation suppressing device for the heating medium according to claim 1, wherein said inlet for the heating medium is provided with a heating medium introducing device, said heating medium introducing device being configured to adjust an inflow angle of the heating medium flowing into an associated one of the passages formed by the heating medium passage forming member.

4. The temperature fluctuation suppressing device for the heating medium according to claim 3, wherein said heating medium introducing device has an adjustable louver comprising at least one louver pivotally mounted to allow an angle of inclination thereof to be adjusted from the outside.

5. The temperature fluctuation suppressing device for the heating medium according to claim 1, wherein said heating medium mixer is provided therein with a stirring device for stirring the heating medium.

6. The temperature fluctuation suppressing device for the heating medium according to claim 1, further comprising:

an inlet temperature measuring device provided on one of said inlet member and a heating medium supply passage connected to said inlet members for measuring an inlet temperature of the heating medium; and an outlet temperature measuring device provided on one of said outlet members and a heating medium supply passage connected to said outlet member for measuring an outlet temperature of the heating medium.

7. The temperature fluctuation suppressing device for the heating medium according to claim 6, further comprising a control device configured to perform a comparison between temperature fluctuation of the heating medium flowing into said heating medium passage forming member and temperature fluctuation of the heating medium flowing out of said heating medium passage forming member based on values measured by said inlet temperature measuring device and said outlet temperature measuring device, respectively, and perform control so as to adjust a flow rate of the heating medium flowing into said heating medium passage forming member based on a result of the comparison.

8. The temperature fluctuation suppressing device for the heating medium according to claim 6, further comprising a control device configured to perform a comparison between temperature fluctuation of the heating medium flowing into said heating medium passage forming member and temperature fluctuation of the heating medium flowing out of said heating medium passage forming member based on values measured by said inlet temperature measuring device and said outlet temperature measuring device, respectively, and perform control so as to adjust an inflow direction of the heating medium flowing into said heating medium passage forming member based on a result of the comparison.

9. A heating medium supply system comprising:

a heating system configured to heat a liquid heating medium by sunlight;

a heat exchanging device configured to heat water supplied thereto by means of the heating medium supplied thereto from said heating system;

a heating medium supply passage for feeding the heating medium from said heating system to said heat exchanging device; and a temperature fluctuation suppressing device provided on said heating medium supply passage for suppressing temperature fluctuation of the heating medium, said temperature fluctuation suppressing device being a temperature fluctuation suppressing device for the heating medium as recited in claim 1.

10. The heating medium supply system according to claim 9, further comprising:

an outlet passage connecting an outlet member of a heating medium mixer provided in said temperature fluctuation suppressing device for the heating medium to said heating medium supply passage;

an upstream side inlet passage connecting an inlet member of said heating medium mixer to a portion of said heating medium supply passage located upstream of a joint between said outlet passage and said heating medium supply passage; and a heating medium feeding device provided on said upstream side inlet passage for feeding the heating medium with a pressure toward said heating medium mixer.

11. The heating medium supply system according to claim 9, further comprising:

an outlet passage connecting an outlet member of a heating medium mixer provided in said temperature fluctuation suppressing device for the heating medium to said heating medium supply passage;

a downstream side inlet passage connecting an inlet member of said heating medium mixer to a portion of said heating medium supply passage located downstream of a joint between said outlet passage and said heating medium supply passage; and a heating medium feeding device provided on said downstream side inlet passage for feeding the heating medium with a pressure toward said heating medium mixer.

12. The heating medium supply system according to claim 9, further comprising:

an outlet passage connecting an outlet member of a heating medium mixer provided in said temperature fluctuation suppressing device for the heating medium to said heating medium supply passage;

an upstream side inlet passage connecting an inlet member of said heating medium mixer to a portion of said heating medium supply passage located upstream of a joint between said outlet passage and said heating medium supply passage;

a downstream side inlet passage connecting said inlet member of said heating medium mixer to a portion of said heating medium supply passage located downstream of said joint between said outlet passage and said heating medium supply passage; and a heating medium feeding device provided on each of said upstream side inlet passage and said downstream side inlet passage for feeding the heating medium with a pressure toward said heating medium mixer.

13. The heating medium supply system according to claim 9, further comprising:
an outlet passage connecting an outlet member of a heating medium mixer provided in said temperature fluctuation suppressing device for the heating medium to said heating medium supply passage;
an upstream side inlet passage connecting an inlet member of said heating medium mixer to a portion of said heating medium supply passage located upstream of a joint between said outlet passage and said heating medium supply passage;
a return passage connecting a portion of said heating medium supply passage located downstream of said joint between said outlet passage and said heating medium supply passage to a portion of said heating medium supply passage located upstream of said joint between said upstream side inlet passage and said heating medium supply passage;
a heating medium feeding device provided on said upstream side inlet passage for feeding the heating medium with a pressure toward said heating medium mixer; and
a heating medium feeding device provided on said return passage for feeding the heating medium with a pressure toward an upstream side portion of said heating medium supply passage.

14. The heating medium supply system according to claim 9, wherein a heating medium mixer provided in said temperature fluctuation suppressing device for the heating medium has two inlet members, one of which is connected to an upstream side portion of said heating medium supply passage, and an outlet member connected to a downstream side portion of said heating medium supply passage, the heating medium supply system further comprising:
a return passage connecting the other inlet member of said heating medium mixer to said downstream side portion of said heating medium supply passage; and
a heating medium feeding device provided on said return passage for feeding the heating medium with a pressure toward said heating medium mixer.

15. The heating medium supply system according to claim 9, wherein a heating medium mixer provided in said temperature fluctuation suppressing device for the heating medium has an outlet member connected to a downstream side portion of said heating medium supply passage, and an inlet member connected to an upstream side portion of said heating medium supply passage, the heating medium supply system further comprising:
a return passage connecting said upstream side portion of said heating medium supply passage located upstream of said heating medium mixer to said downstream side portion of said heating medium supply passage located downstream of said heating medium mixer; and
a heating medium feeding device provided on said return passage for feeding the heating medium with a pressure from the downstream side to the upstream side of said heating medium supply passage.

16. The heating medium supply system according to claim 9, wherein:
said heating system has plural heat collecting zones each provided with a heat collecting unit for heating the heating medium by sunlight collected; and
said plural heat collecting zones are each connected to a respective one of heating medium passages formed by a heating medium passage forming member of said temperature fluctuation suppressing device through a respective one of plural heating medium supply passages so as to supply the liquid heating medium from one heat collecting zone to one heating medium passage.

17. A solar thermal electric power generation system comprising:
a steam turbine; and
a heating medium supply system configured to supply a heating medium for heating water to generate steam to be supplied to said steam turbine, wherein
said heating medium supply system is a heating medium system as recited in claim 9 and is configured to supply steam generated by a heat exchanging device included in said heating medium supply system to said steam turbine.

18. The solar thermal electric power generation system according to claim 17, further comprising:
a gas turbine; and
a waste heat recovery boiler utilizing waste heat of said gas turbine, wherein
steam generated by said waste heat recovery boiler is supplied to said steam turbine.

19. A temperature fluctuation suppressing device for a heating medium provided on a heating medium supply passage for supplying a liquid heating medium to a heat exchanging device, which comprises a heating medium mixer for mixing the heating medium,
said heating medium mixer comprising:
a heating medium passage forming member having plural heating medium passages;
an inlet member allowing the heating medium to flow into said heating medium passage forming member from said heating medium supply passage; and
an outlet member allowing the heating medium to flow out of said heating medium passage forming member to said heating medium supply passage, said outlet member being provided separately from said inlet member,
whereby the heating medium continuously flowing into said heating medium passage forming member through said inlet member passes through said plural heating medium passages with time-lags to form respective streams, which are then joined together before flowing out through said outlet member, wherein:
said heating medium passage forming member comprises a first container defining therein plural cells forming a respective one of said heating medium passages;
each of said cells has an inlet and an outlet for the heating medium;
said inlet member comprises branch portions branched off from said heating medium supply passage which are each connected to a respective one of said inlets of said cells;
said outlet member unifies said outlets of said cells and is connected to said heating medium supply passage; and
said plural cells are formed to have different kinds of volume.

20. The temperature fluctuation suppressing device for the heating medium according to claim 19, wherein said outlet for the heating medium is formed at a location offset from an extension of a central axis of said inlet.

21. The temperature fluctuation suppressing device for the heating medium according to claim 19, wherein said inlet for the heating medium is provided with a heating medium introducing device,
said heating medium introducing device being configured to adjust an inflow angle of the heating medium flowing into an associated one of the passages formed by the heating medium passage forming member.

22. A temperature fluctuation suppressing device for a heating medium provided on a heating medium supply passage for supplying a liquid heating medium to a heat exchanging device, which comprises a heating medium mixer for mixing the heating medium,
  said heating medium mixer comprising:
    a heating medium passage forming member having plural heating medium passages;
    an inlet member allowing the heating medium to flow into said heating medium passage forming member from said heating medium supply passage; and
    an outlet member allowing the heating medium to flow out of said heating medium passage forming member to said heating medium supply passage, said outlet member being provided separately from said inlet member,
  whereby the heating medium continuously flowing into said heating medium passage forming member through said inlet member passes through said plural heating medium passages with time-lags to form respective streams, which are then joined together before flowing out through said outlet member, wherein:
  said heating medium passage forming member comprises plural second containers each forming a respective one of said heating medium passages;
  each of said second containers has an inlet and an outlet for the heating medium;
  said inlet member comprises branch portions branched off from said heating medium supply passage which are each connected to a respective one of said inlets of said second containers;
  said outlet member unifies said outlets of said second containers and is connected to said heating medium supply passage; and
  said branch portions of said inlet member are each provided with a flow control device which is capable of adjusting a flow rate of the heating medium.

23. A temperature fluctuation suppressing device for a heating medium provided on a heating medium supply passage for supplying a liquid heating medium to a heat exchanging device, which comprises a heating medium mixer for mixing the heating medium,
  said heating medium mixer comprising:
    a heating medium passage forming member having plural heating medium passages;
    an inlet member allowing the heating medium to flow into said heating medium passage forming member from said heating medium supply passage; and
    an outlet member allowing the heating medium to flow out of said heating medium passage forming member to said heating medium supply passage, said outlet member being provided separately from said inlet member,
  whereby the heating medium continuously flowing into said heating medium passage forming member through said inlet member passes through said plural heating medium passages with time-lags to form respective streams, which are then joined together before flowing out through said outlet member, wherein:
  said heating medium passage forming member comprises plural second containers each forming a respective one of said heating medium passages;
  each of said second containers has an inlet and an outlet for the heating medium;
  said inlet member comprises branch portions branched off from said heating medium supply passage which are each connected to a respective one of said inlets of said second containers;
  said outlet member unifies said outlets of said second containers and is connected to said heating medium supply passage; and
  said plural second containers are formed to have different kinds of volume.

24. A temperature fluctuation suppressing device for a heating medium provided on a heating medium supply passage for supplying a liquid heating medium to a heat exchanging device, which comprises a heating medium mixer for mixing the heating medium,
  said heating medium mixer comprising:
    a heating medium passage forming member having plural heating medium passages;
    an inlet member allowing the heating medium to flow into said heating medium passage forming member from said heating medium supply passage; and
    an outlet member allowing the heating medium to flow out of said heating medium passage forming member to said heating medium supply passage, said outlet member being provided separately from said inlet member,
  whereby the heating medium continuously flowing into said heating medium passage forming member through said inlet member passes through said plural heating medium passages with time-lags to form respective streams, which are then joined together before flowing out through said outlet member, wherein:
  said heating medium passage forming member comprises a container provided therein with a perforated plate having multiple perforations each forming a respective one of said heating medium passages;
  said container is provided with said inlet member and said outlet member;
  said perforated plate is positioned to partition an internal space of said container into a space on an inlet member side and a space on an outlet member side; and
  said perforations are formed over the perforated plate except a region of said perforated plate including a portion of said perforated plate intersecting a central axis of a heating medium flow passage defined by said inlet member to extend inwardly of said container and a region around said portion.

25. The temperature fluctuation suppressing device for the heating medium according to claim 24, wherein said perforated plate comprises a plurality of such perforated plates spaced from each other.

26. The temperature fluctuation suppressing device for the heating medium according to claim 24 wherein a heating medium introducing device is provided on one of said inlet member and a portion of said container lying adjacent to said inlet member,
  said heating medium introducing device being configured to adjust an inflow angle of the heating medium flowing into said container.

27. The temperature fluctuation suppressing device for the heating medium according to claim 24, wherein said inlet member comprises a plurality of such inlet members to allow selection of one of the inlet members to be made switchingly for the heating medium to flow into said container therethrough.

28. The temperature fluctuation suppressing device for the heating medium according to claim 27, wherein said outlet member comprises a plurality of such outlet members to allow selection of one of the outlet members to be made switchingly in synchronism with switching between said inlet members for the heating medium to flow out of said container therethrough.

29. The temperature fluctuation suppressing device for the heating medium according to claim 24 wherein said inlet member comprises a plurality of such inlet members each provided with a flow control device for adjusting a flow rate of the heating medium passing through an associated one of said inlet members.

* * * * *